(12) United States Patent
Levy et al.

(10) Patent No.: US 11,483,494 B1
(45) Date of Patent: Oct. 25, 2022

(54) VIDEO-BASED CONVERSATIONAL INTERFACE

(71) Applicant: Twyn Limited, London (GB)

(72) Inventors: Timothy Philip Levy, London (GB); James Donald Edmondson, London (GB); Philip Cowans, London (GB); Adam Page, London (GB)

(73) Assignee: Twyn Limited, London (GB)

( * ) Notice: Subject to any disclaimer, the term of this patent is extended or adjusted under 35 U.S.C. 154(b) by 0 days.

(21) Appl. No.: 17/647,442

(22) Filed: Jan. 7, 2022

Related U.S. Application Data

(63) Continuation of application No. 17/455,868, filed on Nov. 19, 2021, now abandoned.

(30) Foreign Application Priority Data

May 13, 2021 (GB) ...................................... 2106833

(51) Int. Cl.
*H04N 5/272* (2006.01)
*H04N 5/262* (2006.01)
(Continued)

(52) U.S. Cl.
CPC ........... *H04N 5/2628* (2013.01); *G10L 15/22* (2013.01); *H04N 5/23293* (2013.01);
(Continued)

(58) Field of Classification Search
None
See application file for complete search history.

(56) References Cited

U.S. PATENT DOCUMENTS 8,892,670 B2 * 11/2014 Chakravarthy ......... H04L 67/01
705/14.66
10,567,314 B1 2/2020 Chang et al.
(Continued)

FOREIGN PATENT DOCUMENTS

CN 109271498 A 1/2019
KR 20000036463 A 7/2000
(Continued)

OTHER PUBLICATIONS

Combined Search and Examination Report for GB Application No. 2106833.3 dated Oct. 18, 2021, 9 pages.
(Continued)

*Primary Examiner* — Rinna Yi
(74) *Attorney, Agent, or Firm* — Knobbe, Martens, Olson & Bear, LLP

(57) ABSTRACT

In an answer view, a first video segment is selected based on a first natural language input and displayed in a main display region, and a self-video image of a user is displayed in a peripheral display region having a smaller area than the main display region. To transition from the answer view to a question view, the self-video image is enlarged to replace the first video segment in the main display region. A second natural language input is received. To transition from the question view to the answer view, the self-video image is reduced to occupy the peripheral display region and the self-video image is replaced in the main display region with a second video segment selected based on the second natural language input. The video segments are pre-recorded video response segments spoken by the same person. Enlarging the self-video image masks the transition between the video segments.

19 Claims, 14 Drawing Sheets

(51) Int. Cl.
*H04N 5/232* (2006.01)
*G10L 15/22* (2006.01)
*G06F 3/04817* (2022.01)
*G06F 3/0482* (2013.01)

(52) U.S. Cl.
CPC ........... *H04N 5/272* (2013.01); *G06F 3/0482* (2013.01); *G06F 3/04817* (2013.01); *G06F 2203/04803* (2013.01); *G06F 2203/04804* (2013.01)

(56) References Cited

U.S. PATENT DOCUMENTS

| | | | |
|---|---|---|---|
| 10,999,344 B1* | 5/2021 | Babkin | ................ H04L 65/765 |
| 2002/0010584 A1 | 1/2002 | Schultz et al. | |
| 2007/0188502 A1 | 8/2007 | Bishop | |
| 2008/0259155 A1* | 10/2008 | McLelland | ............ H04N 7/147 |
| | | | 348/14.03 |
| 2010/0286987 A1 | 11/2010 | Han et al. | |
| 2013/0242031 A1 | 9/2013 | Petterson et al. | |
| 2016/0057083 A1 | 2/2016 | Ciofalo et al. | |
| 2016/0065880 A1 | 3/2016 | Pearson et al. | |
| 2018/0048865 A1* | 2/2018 | Taylor | ................ H04N 5/23293 |
| 2018/0293483 A1 | 10/2018 | Abramson et al. | |
| 2019/0036856 A1* | 1/2019 | Bergenlid | ............... G10L 15/22 |
| 2020/0395008 A1 | 12/2020 | Cohen et al. | |
| 2021/0249009 A1* | 8/2021 | Manjunath | .............. G10L 15/26 |
| 2021/0250548 A1 | 8/2021 | Kim | |

FOREIGN PATENT DOCUMENTS

| | | |
|---|---|---|
| KR | 20020090244 A | 12/2002 |
| KR | 101738142 B1 | 5/2017 |
| KR | 101925440 B1 | 12/2018 |
| KR | 102104294 B1 | 4/2020 |
| WO | WO 2020/186300 A1 | 9/2020 |

OTHER PUBLICATIONS

Maglogiannis, et al., An Overview of Chatbot Technology, Artificial Intelligence Applications and Innovations, May 6, 2020, 11 pages.

Tommy et al., The Combination of Natural Language Processing and Entity Extraction for Academic Chatbot, The 8th International Conference on Cyber and IT Service Management (CITSM 2020), On Virtual, Oct. 23-24, 2020, 6 pages.

\* cited by examiner

VIDEO-BASED CONVERSATIONAL INTERFACE

TECHNICAL FIELD

The present disclosure pertains generally to video-based conversational interfaces, and in particular addresses certain challenges that arise when implementing such interfaces using pre-recorded video segments.

BACKGROUND

Conversational user interfaces (CUIs) have been available for some time, and the underlying technology is becoming increasingly sophisticated. Known applications of such interfaces include "chat bot" interfaces that emulate human conversations via text message exchanges and "virtual assistants" that facilitate access to computer functions based on voice commands A core feature of such interfaces is their ability to receive, interpret and respond to free-form natural language inputs from a user, leveraging advances in natural language processing (NLP), natural language understanding (NLU) and natural language generation (NLG) to facilitate more effective human-computer interaction. Typically, the CUI is equipped to generate a text response to a natural langue input, and may additionally be equipped with "synthetic" speech capabilities (the ability to convert generated text to synthetic speech). The term "autonomous agent" may be used herein to refer to a computer program (or set of computer programs, e.g. in a distributed system) capable interpreting natural language input, and providing suitable responses in a way that mimics (at least to a degree) a human-to-human conversation. Such systems fall within the umbrella of artificial intelligence (AI) in the broad sense, and the terms autonomous agent and AI agent are used synonymously. A CUI may be implemented as a combination of an AI agent and a user interface configured to receive natural language inputs and output the responses of the AI agent.

More recently, certain CUIs have been extended to incorporate video modalities. As with audio, much of the work in this area has focused on the use of synthetic video to accompany synthetic speech. This approach may be referred to as "generative" herein, meaning, in the broadest sense, that synthetic audio and video content is generated in response to inputs from the user. Synthetic video includes, for example, the use of 3D modelling and rendering techniques, as well as so-called "deep fake" technology and the like that uses generative machine learning models to produce increasingly realistic synthetic video data. Such generative approaches work broadly as follows: a natural language is received and interpreted (for example based on intent recognition), and a suitable text response is generated. The generated text is passed to a synthetic audio generation component, which converts the text to audio using some speech synthesis method. Synthetic video is similarly generated in response to the generated text, to give the appearance of a human or other character speaking the synthetic audio. The generative approach has various drawbacks, including the computational burden associated with the generation synthetic speech and video in (pseudo) real-time. Another issue is realism and user engagement. One option is to use highly 'stylized' synthetic video (e.g. of obviously animated characters etc.), but this approach may not be appropriate or engaging in many contexts. Another option is to attempt to generate realistic synthetic video, matching the appearance of a real human speaking as closely as possible, but this also has its drawbacks: if unsuccessful, the result is likely to be jarring and distracting; on the other hand if successful, this approach raises other serious concerns around trustworthiness and deception. To provide a basic level of visual engagement, a generative CUI might, for example, select pre-recorded animations, graphics and the like to accompany generated text responses, but which are only loosely connected to the generated test response.

SUMMARY

An alternative approach to video-based CUIs uses pre-recorded video segments that capture spoken responses to anticipated user questions. This approach moves away from generated text, with the user's natural language input instead used to select appropriate video segments to display. Such an approach may be referred to herein as a "selection" approach to video-based CUIs, to distinguish from generative approaches of the kind outlined above. One application of the selective approach is to provide a conversational experience with a real person (for example, a well-known personality), based on a library of pre-recorded video segments of that person speaking.

The selection approach overcomes many of the drawbacks of the generative approach. On the other hand, the selection approach presents its own specific technical challenges. A core requirement of CUIs is flexibility. A "conversation flow" between a user and a CUI is driven primarily by the user, and the CUI needs to be sufficiently flexible to provide an engaging conversation experience. When the response is (or includes) pre-recorded video segments of the same person speaking, the CUI would typically need the ability select and play-out video clips in (more or less) any order, as dictated by the user's chosen sequence of inputs. The CUI may also need the ability to handle "interruption" by the user, in which case it may be required to transition between video clips not only at predetermined transition points, but at (more or less) any point within the timeline of a video segment. A naïve implementation of the selection approach could, therefore, result frequent obvious transitions between different video segments, to which the human visual system is highly sensitive, resulting in a visually-jarring experience.

A need therefore arises for technology that can more effectively mask transitions between pre-recorded video segments in the context of such video-based CUIs.

According to a first aspect of the present disclosure, a method is provided for effecting a video-based conversational interface at a computer device. The method is implemented at the computer device and comprises the steps of: receiving, from a user of the computer device, a first natural language input; causing a display of the computer device to render an answer view, in which a first video segment is displayed in a main display region, and a self-video image of the user is displayed in a peripheral display region having a smaller area than the main display region, the self-video image captured by an image capture device of the computer device, and the first video segment selected based on the first natural language input; transitioning the display from the answer view to a question view, by enlarging the self-video image to replace the first video segment in the main display region; receiving, from the user, a second natural language input; and transitioning the display from the question view to the answer view, by reducing the self-video image to occupy the peripheral display region and replacing the self-video image in the main display region with a second video segment selected based on the second natural language input, the first and second video segments each selected from a set of pre-recorded video response segments spoken by the same person, whereby the enlarging of the self-video image in the question view masks the transition between the first video segment and the second video segment.

In the answer mode, the self-video image mirrors a video call layout, with the pre-recorded video segment shown in the main display region as if were the video stream of another call participant, and the user's own video shown in the peripheral display region to provide a secondary point of visual engagement. The enlargement of the self-video image in the question mode differs from the visual layout of a conventional video call, and serves two purposes:

firstly, it provides intuitive visual feedback to indicate to the user that the computer device is now expecting the user to provide input, and secondly it effectively masks the transition to whatever video segment is selected next.

In embodiments, in the question view, an idle image or video segment of said person may be displayed in the peripheral display region.

The idle image/video segment creates the impression that the other "person" is still on the video call. If the idle image/video segment were to be played immediately after the first video segment in the main display region, this would, in all likelihood, result in a noticeable and jarring visual transition between the videos. However, this transition is masked by effectively moving the other person to the smaller peripheral display region, and bringing the user's self-image to the larger and more prominent main display area that is their main visual focus. The overall result is a transition from the first video segment to the idle image/ video segment, to which the human visual system is far less sensitive. The same is true of the transition from the idle image/video segment to the second video segment, as the display transitions from the question view back to the answer view. The user is therefore far less likely to notice differences between the idle image/video segments and the segments immediately before and after it.

An idle video segment could capture a degree of movement from the other person (such as blinking, nodding, scratching of the head etc.) to provide a more realistic impression of another person on the call. That said, a static idle image may also be sufficient, because that image is displayed in the smaller, peripheral display region, outside of the user's main visual focus, and the user's eye will inevitably be drawn to their own, larger and more prominent self-image.

The first and second natural language inputs may comprise first and second voice inputs received at the computer device.

The use of voice inputs has various benefits. As well as providing a more realistic conversation experience, when the user is speaking a voice input in the question mode, the motion of the user speaking in the enlarged self-video image will further distract the user from the transitions between pre-recorded video segments.

A first transition effect may be rendered to transition from the answer view to the question view, by incrementally increasing the area of the self-video image, so as to obscure an increasingly larger area of the first video segment in the main display region, until the first video segment is fully obscured by the enlarged self-video image.

The first transition may further comprise incrementally increasing an opacity of the above idle image or video segment from zero to one.

A second transition effect may be rendered to transition from the question view to the answer view, by incrementally reducing the area of the self-video image, so as to reveal an increasingly large area of the second video segment in the main display region.

The second transition effect may additionally comprise incrementally reducing an opacity of the idle from one to zero as the second transition effect is rendered.

The transition from the question view to the answer view may be substantially instantaneous, and a motion effect may be applied to the self-video image in the peripheral display region immediately thereafter.

The transition from the answer view to the question view may be substantially instantaneous, and said motion effect may be applied to the above idle video image or segment in the peripheral display region immediately thereafter.

Said motion effect may dynamically vary the area of the peripheral display region for a time interval after the instantaneous transition.

The method may comprise: transmitting, in a first message to a conversation management system, remote from the computer device, data of the first natural language input for selecting the first video segment at the conversation management system; receiving from the conversation management system a first response comprising or indicating the first video segment; transmitting, in a second message to the conversation management system, data of the second natural language input for selecting the second video segment at the conversation management system; and receiving from the conversation management system a second response comprising or indicating the first video segment;

The data of the first and second natural language inputs may comprise text extracted from the first and second voice inputs respectively, using automatic speech recognition performed at the computer device.

For example, first and second links, indicating the first and second video segments respectively, may be provided in the first and second responses respectively, the first and second links used to stream the first and second video segments from a video streaming server for displaying at the computer device.

First and second user intents may be recognized in the first and second natural language inputs respectively, and the first and second video segments may be selected by matching the first and second user intents to first and second intent labels associated with the first and second video segments respectively.

A second aspect herein provides a computer device for effecting video-based conversational interface, the computer device comprising: a display; an image capture device configured to capture a self-video image of a user of the computer device; one or more processors coupled to the display and the image capture device, and configured to transition the display between: (ii) an answer view, in which a selected video segment is displayed in a main display region, and the self-video image is displayed in a peripheral display region having a smaller area than the main display region, and (ii) a question view, in which the self-video image is displayed in the main display area. The one or more processors are configured to receive, from the user, natural language inputs for selecting video segments to be displayed in the main display area in the answer view. The one or more processors are configured to render the answer view with a selected first video segment occupying the main display area, transition from the answer view to the question view by enlarging the self-video image to replace the first video segment in the main display region, and transition from the question view to the answer view, by reducing the self-video image to occupy the peripheral display region and replacing the self-video image in the main display region with a selected second video segment. The first and second video segments are selected from a set of pre-recorded video response segments spoken by the same person, whereby the enlarging of the self-video image in the question view masks transitions between the first and second video segments.

The one or more processors may be further configured to render, on the display, a list of predetermined conversation prompts that are selectable to cause a video segment to be selected, whereby the user can choose to provide natural language input or select one of the predetermined conversation prompts in order to transition to the answer view.

The one or more processors may be configured to display, in response to a topic suggestion input received in the answer view, a list of predetermined conversation prompts, which is rendered so as to obscure the main display area, each of the predetermined conversation prompts selectable to cause a different video segment to be selected and rendered in the main display area, whereby the list of predetermined conversation prompts masks the transition to the different video segment in that event.

The one or processors may be configured to instigate the transition from the answer view to the question view responsive to: the first video segment reaching a predetermined termination time, or an interrupt input received from the user at the computer device.

The answer view may include a visual interrupt icon that is selectable to instigate the interrupt input.

The one or more processors may be coupled to an audio capture device of the computer device, and may be configured to begin capturing a voice input from the user upon transitioning to the question view, and extract a natural language input from the voice input for selecting a video segment using automated speech recognition.

Another aspect herein is directed to a computer program configured to program a computer device to carry out any of the steps or implement any of the functions taught herein.

Another aspect herein is directed to a computer system for effecting video-based conversational interface, the computer system comprising: a rendering component configured to generate rendering data for rendering, on a display of a computer device, views of the video-based conversational interface, the rendering component configured to transition between: (ii) an answer view, in which a selected video segment is displayed in a main display region, and a self-video image, captured from a user of the computer device, is displayed in a peripheral display region having a smaller area than the main display region, and (ii) a question view, in which the self-video image is displayed in the main display area; a natural language interpretation component configured to receive natural language inputs captured from the user, and process the natural language inputs to recognize user intent therein; a content management component configured to select the video segments, from a set of pre-recorded video response segments spoken by the same person, by matching the user intents recognized in the natural language inputs to intent labels associated with the pre-recorded video response segments. The rendering component is configured to generate the rendering data so as to: render the answer view with a selected first video segment occupying the main display area, transition from the answer view to the question view by enlarging the self-video image to replace the first video segment in the main display region, and transition from the question view to the answer view, by reducing the self-video image to occupy the peripheral display region and replacing the self-video image in the main display region with a selected second video segment, whereby the enlarging of the self-video image in the question view masks the transition between the first and second video segments.

The computer system may comprise an automated speech recognition component configured to extract the natural language inputs, in text format, from voice inputs captured at the computer device.

The pre-recorded video response segments may be stored in a database of pre-recorded video segments of said person speaking, the pre-recorded video segments additionally comprising narrative video segments organized arranged in multiple chapters, and multiple topics within each chapter, wherein the rendering component is configured to render a predetermined list of chapters, and a predetermined list of topics within each chapter, whereby the user can select video segments by providing natural language input, by selecting a chapter, or selecting a topic within a chapter.

BRIEF DESCRIPTION OF FIGURES

For a better understanding of the present disclosure, and to show how embodiments of the same may be carried into effect, reference is made by way of example only to the following figures in which.

DETAILED DESCRIPTION

Figure 1:
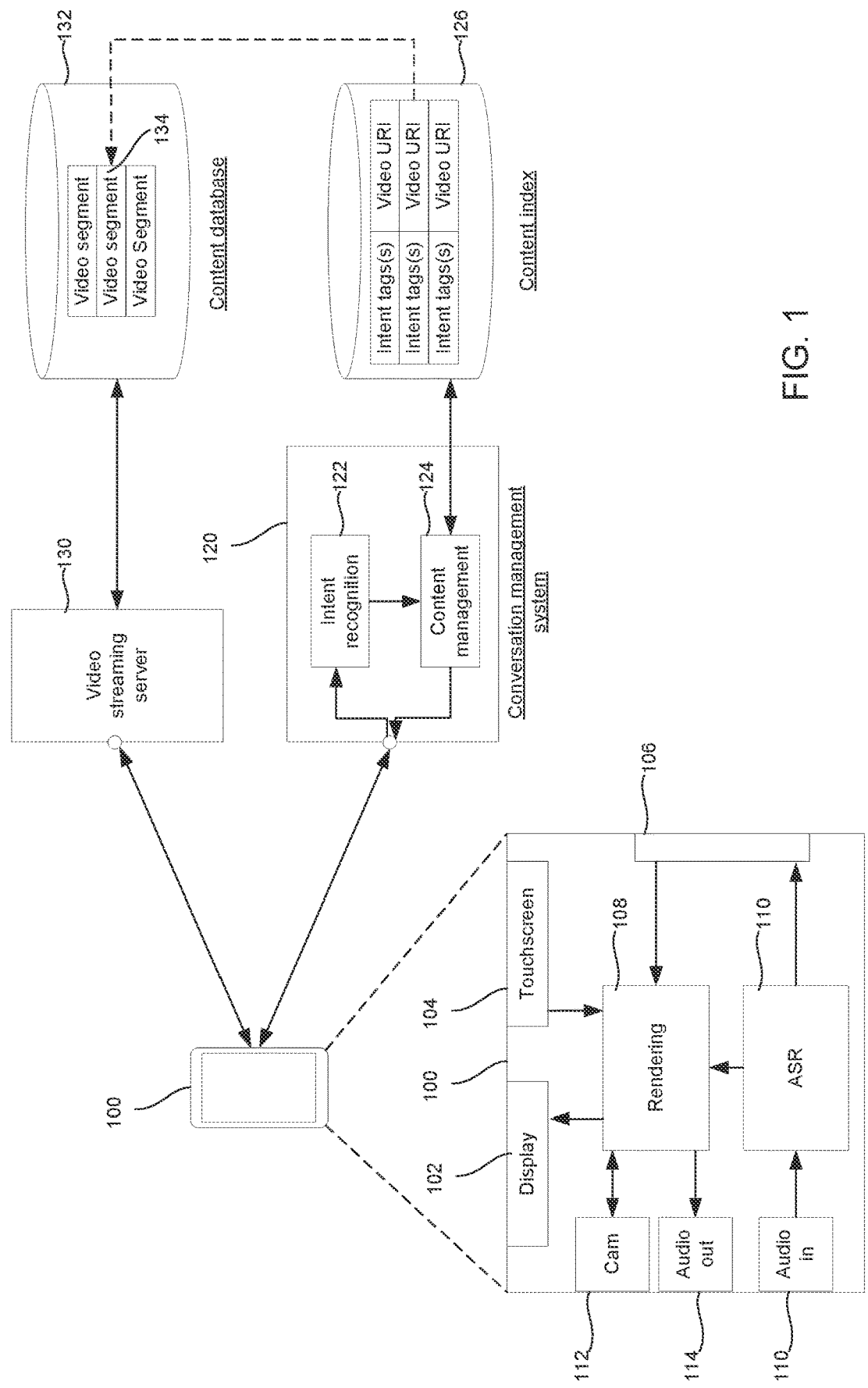
FIG. 1 shows a schematic block diagram of a networked computer system for implementing a video-based conversational interface.

FIG. 1 shows a schematic block diagram of a network computer system, arranged to provide a video based CUI is implemented at a computer device 100. The computer device 100 is a mobile device in the present example, such as a smartphone or tablet device, but it will be appreciated that the computer device 100 can take any form including other forms of consumer device (wearables, laptop/desktop computers, smart TVs etc.). An expanded view of the computer device 100 shows it to comprise a rendering component 108 and an automated speech recognition component (ASR) 110. The components 108, 110 are functional components, representing functionality implemented on a hardware processor(s) of the computer device 100 (not shown). As will be readily apparent to anyone familiar with modern computer technology, such functionality would typically be implemented in software, by way of program instructions loaded into instruction memory of the processor(s) and which, upon execution, cause the processor(s) to carry out the operations described herein. The components 108, 110 may for example be embodied in an application executed on the processor, or certain functions may be "native" to the computer device 100 or its operating system and accessed by the application though application programming interface (API) or other suitable mechanism. Additionally, the computer device 100 is shown to comprise a display 102, an input device 104, an image capture device 112 (camera), an audio input device 114 such as an integrated or external microphone (wired or wireless), and at least one audio input device 110 such as an integrated loudspeaker or external loudspeaker, headphone, earbud (wired or wireless) etc. The image capture device 112 is front-facing, in that its field of view is directed towards an expected location of a user operating the device 100. The image capture device 112 could, for example, take the form of an integrated front-facing camera in a user device or a webcam mounted on an external display etc. In this example, the input device 104 is a touchscreen for sensing touch input on the display 102, and the display 102 and the touchscreen 104 are integrated in the device 100. However, in other devices, such components could be external and/or the input device 104 could take other forms (mouse, trackpad, keyboard etc.).

The system is shown to further comprise a conversation management system 120 and a video streaming server 130, implemented remotely from the computer device 100 and accessed by way of messages transmitted and received via a network interface 106 of the device 100.

The conversation management system 120 is shown to comprise an intent recognition component 112 and a content management component 124, which are functional components that would typically be implemented in software executed on one or more processors of the conversation management system 120 (not depicted).

In operation, a voice input captured at the computer device 100, via the audio input device 110, is processed by the ASR component 110 to generate a text transcript. The text transcript is transmitted from the computer device 100 in a message to the conversation management system 120, where it is processed by the intent recognition component 122 to recognize a user intent indicated in the voice input. The voice input and text transcript are examples of natural language inputs as that term is used herein. Natural language inputs may also be inputted to the device by a user in text form directly, for example using a physical or soft keyboard. Unlike a command in the programming sense, a natural language input is not required to conform to any particular format or syntax. The user has a degree of freedom in the expression of their intent, and the intent recognition component 122 operates to extract the underlying user intent from the free-from natural language input. Intent recognition per se is known, and further details are discussed only to the extent they are directly relevant to the described embodiments.

In contrast to generative CUIs, the present approach extracts user intent so that the user intent can be matched to pre-recorded video segments. A content index 126 is depicted, in which pre-recorded video segments are indexed with searchable intent labels (tags) that can be matched to a recognized user intent. Once a suitable video segment 134 has been selected, a response is transmitted back to the computer device 100 containing a link (such as a URI or URL) to the selected video segment 134 in a content database 132 accessible to the video streaming server 130. Using the provided link, the computer device 100 is then able to stream the selected video segment 134 from the video server 130 using a suitable video streaming protocol (such as HTTP live streaming).

The intent recognition system 122 and content management component 124 operate as an AI agent as that term is used herein.

The video segments held in the content database 143 are recorded and tagged for providing a conversation experience with a specific, real person (the "performer", who might, for example, be a celebrity or other known personality) who appears in the pre-recorded video segments. In this context, the AI agent may be referred to as a "Twyn" of the performer in question. The pre-recorded video segments include "answer" segments, in which the performer is recorded speaking responses to anticipated questions. The anticipated questions, in turn, correspond to user intents that are recognizable to the intent recognition component 122. For example, the intent recognition component 122 may take the form of an intent classifier that has been trained to classify natural language inputs in relation to predetermined intent classes corresponding to the anticipated questions.

A conversation is conducted with a Twyn in the manner of a video call, but with some important differences that are described later. A self-image (206, FIGS. 2(*a*) and 2(*b*)) is displayed alongside the Twyn's video steam, which is a locally-captured video feed from the front-facing camera 112.

For conciseness, reference may be made to a Twyn speaking or performing some action, as if the Twyn were another human call participant. Whilst the intention is to provide a convincing approximation that experience, as indicated, this is achieved (more or less) exclusively using pre-recorded video segments played in sequence. Thus, a response "spoken" by a Twyn is actually a pre-recorded video segment of the performer previously speaking that response in the real-world. A Twyn's video stream is actually a sequence of pre-recorded video segments that are selected, at least in part, based on natural language inputs from the user. With limited exceptions, synthetic video is not used in the described examples. One possible exception is that synthetic audio and video may be used to show the Twyn speaking the user's name, as it would not be feasible to pre-record all possible names.

The Twyn system allows a user to select a performer "profile" from a plurality of performer profiles (different people/Twyns), each performer profile having one or more "stories" associated therewith, and each story including a sequence of chapters. A "chapter mode" (or "narrative" mode) provides a more narrative-driven experience, in which video segments are selected primarily according to the chapter structure of the selected story. In chapter mode, the user need not actively engage, and is free to simply passively consume the video content of the chapters. However, the user has the ability to "interrupt", or to select different chapters or "topics". Certain video content is only available through active interruption or topic selection. A "question-and-answer" (Q&A) mode is primarily driven by the user directing questions to the Twyn, and the Twyn responding accordingly. Further details of the different modes are described below with reference to FIG. 3.

The "story" terminology is reflective of the available video content, which is typically focussed on a specific theme (such as a well-known television program or movie associated with the performer). The user is encouraged to focus their line of questioning on the specific theme, although video content is also provided to address "off-theme" questioning, for example by the performed suggesting a different line of questioning or directing the user to a different story. Questions deemed inappropriate may be "blocked" e.g. by displaying a message informing the user that certain topics are "off-limits".

The CUI is mainly provided by way of a graphical user interface (GUI) is rendered on the display 102 of the device 100, together with accompanying audio. Broadly speaking, the GUI has two primary views—a "question view" and an "answer view", depicted schematically in FIGS. 2(*a*) and 2(*b*) respectively. In the question view, the Twyn's video stream is displayed more prominently than the user's self-image, in the manner of a video call. By contrast, in the question view, the user's self-image is shown more prominently than the Twyn's (the opposite of a conventional video call). For this reason, the transition between question and answer views is described as a "face swap". The purpose of the face swap is to mask what would otherwise be visible transitions between different video segments in the Twyn video stream. Note that the terms "question view" and "answer view" are simply a convenient shorthand to refer to the relative layout of the videos, and those terms will not necessarily be reflective of the Twyn experience at all times. For example, in the following examples, the answer view is also used to deliver more narrative-driven content that may not have been selected in response to any question from the user. Similarly, a pre-recorded video segment (displayed in the answer view) might pose a question from the Twyn to the user, which the user then answers (via voice input provided in the question view), reversing the roles of the user and the Twyn.

Figure 2A:
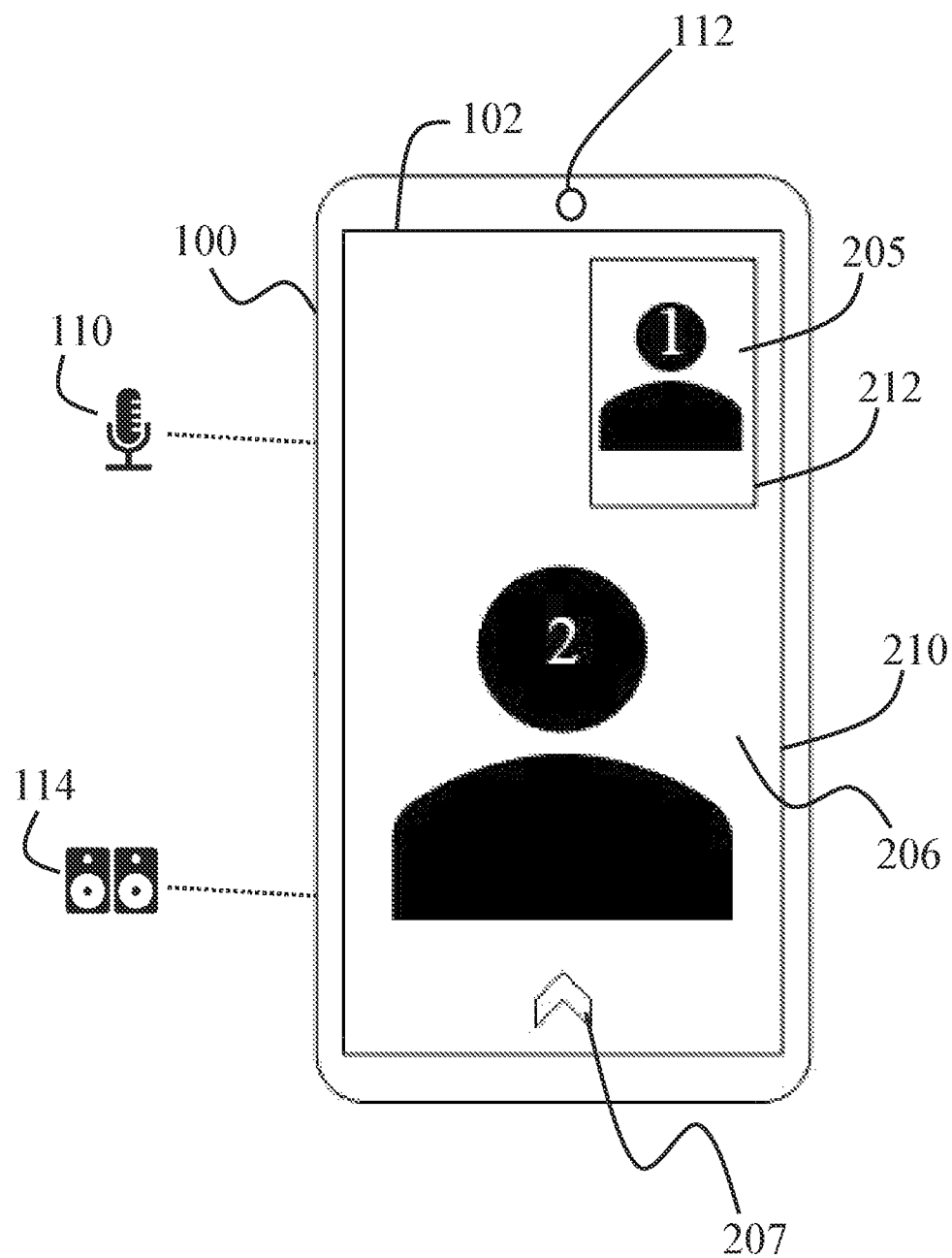
FIG. 2(a) schematically depicts a question view displayed on a mobile device.
Figure 2B:
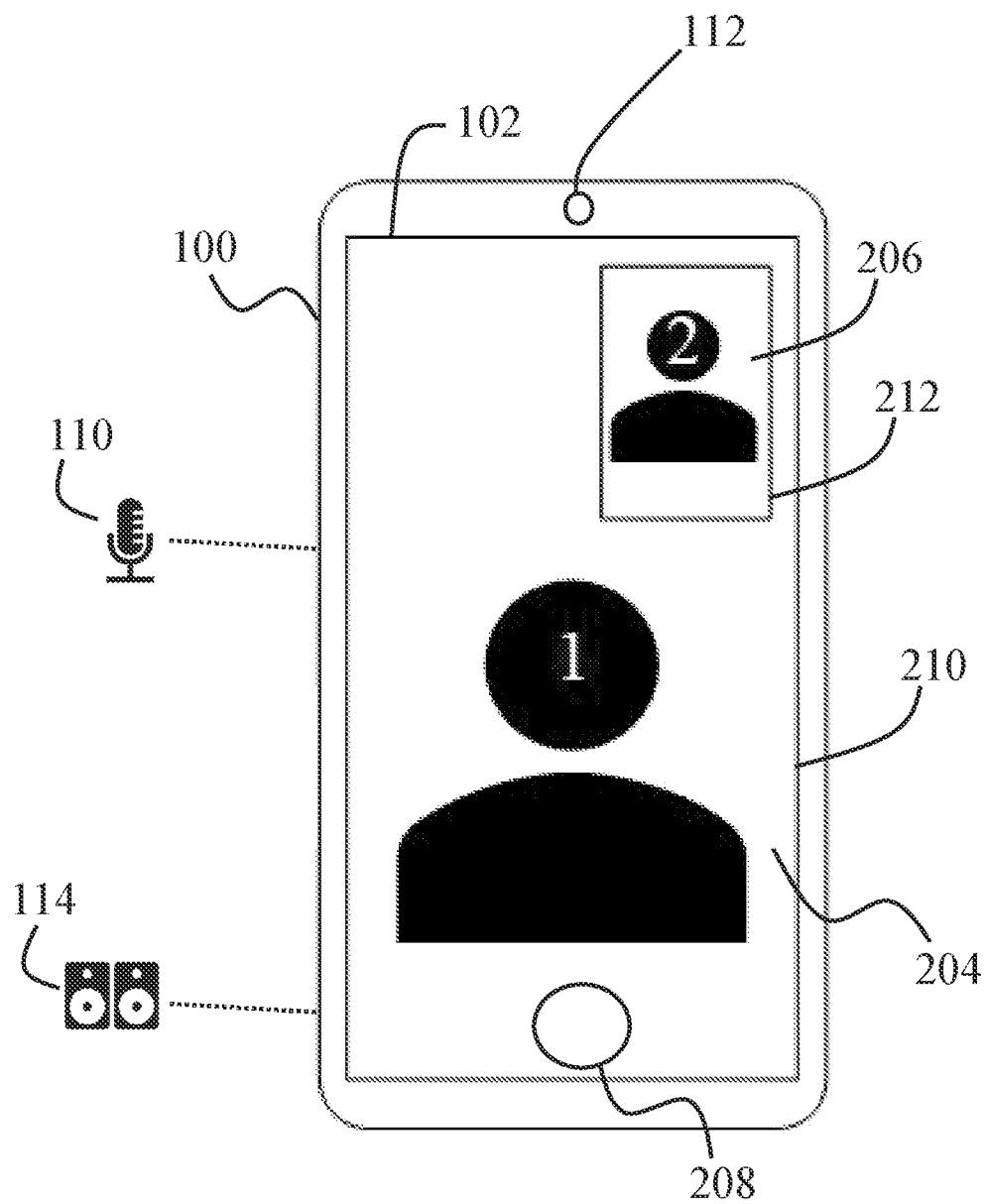
FIG. 2(b) schematically depicts and answer view displayed on a mobile device.

FIG. 2(*a*) schematically depicts a question view, having a main display region 210 and a secondary display region 212. The main display region 210 has a greater area than the secondary display region 212. In the depicted example, the main display region 210 occupies all or most of the available area of the display 102, whilst the secondary display region 212 is significantly smaller. The secondary display region 212 is peripheral, in that it is located so as to fall outside of the user's main visual focus when the user is looking at the image in the main display region 210 (towards a corner of the main display region 210 in the depicted example).

In the question view, the locally captured video feed (self-video) 206 captured by the front-facing camera 112 occupies the main display region 212. An "idle" video segment, representing the Twyn, is rendered in the secondary display region 206. The idle video segment may, for example, be a video segment recording some degree of movement by the performer, such as blinking, nodding, and/or other aspects or normal body movement. In practice, one or a few idle segments are sufficient, and it is feasible to use looped idle segment(s), if necessary, that have been arranged to loop with no or minimal visual transitions. When the question view is rendered, the audio input device 110 is also activated for receiving voice input.

In the question view, the idle video segment 206 in the secondary display region 212 may be rendered at a lower resolution than the locally captured feed 204 in the main display region 210. The pixel density of the idle video segment 206 in the secondary display region 212 may be the same as the pixel density of the locally captured feed 210 that is rendered in the main display region 210. A reduction in resolution may therefore be a result of the smaller area taken up by the secondary display region 212 whilst the user interface is in the question view.

The user interface also includes at least one selectable interface element 207 which, when selected, causes a list of suggested questions or "topics" to appear, and which are selectable as an alternative to providing natural language input. The suggested questions guide the user to engage with the Twyn more effectively, and are generally focused on the theme of the selected story.

FIG. 2(*b*) shows the same user device 100 but rendering the answer view. In the answer view, the secondary display region 212 is now occupied by the user's self-image 206, and the main display region 210 is occupied by pre-recorded video segment 204 of the Twyn speaking. For example, the device 100 may have transitioned to the answer mode following a voice input provided by the user in the question mode, in which case the pre-recorded video segment 204 shows the performer speaking a response to the user's voice input, with the audio of the video segment 204 played out via the audio output device 114.

An interrupt icon 208 is displayed, which the user can select to force a transition to the question view of FIG. 2(*a*) at any time.

Figure 3:
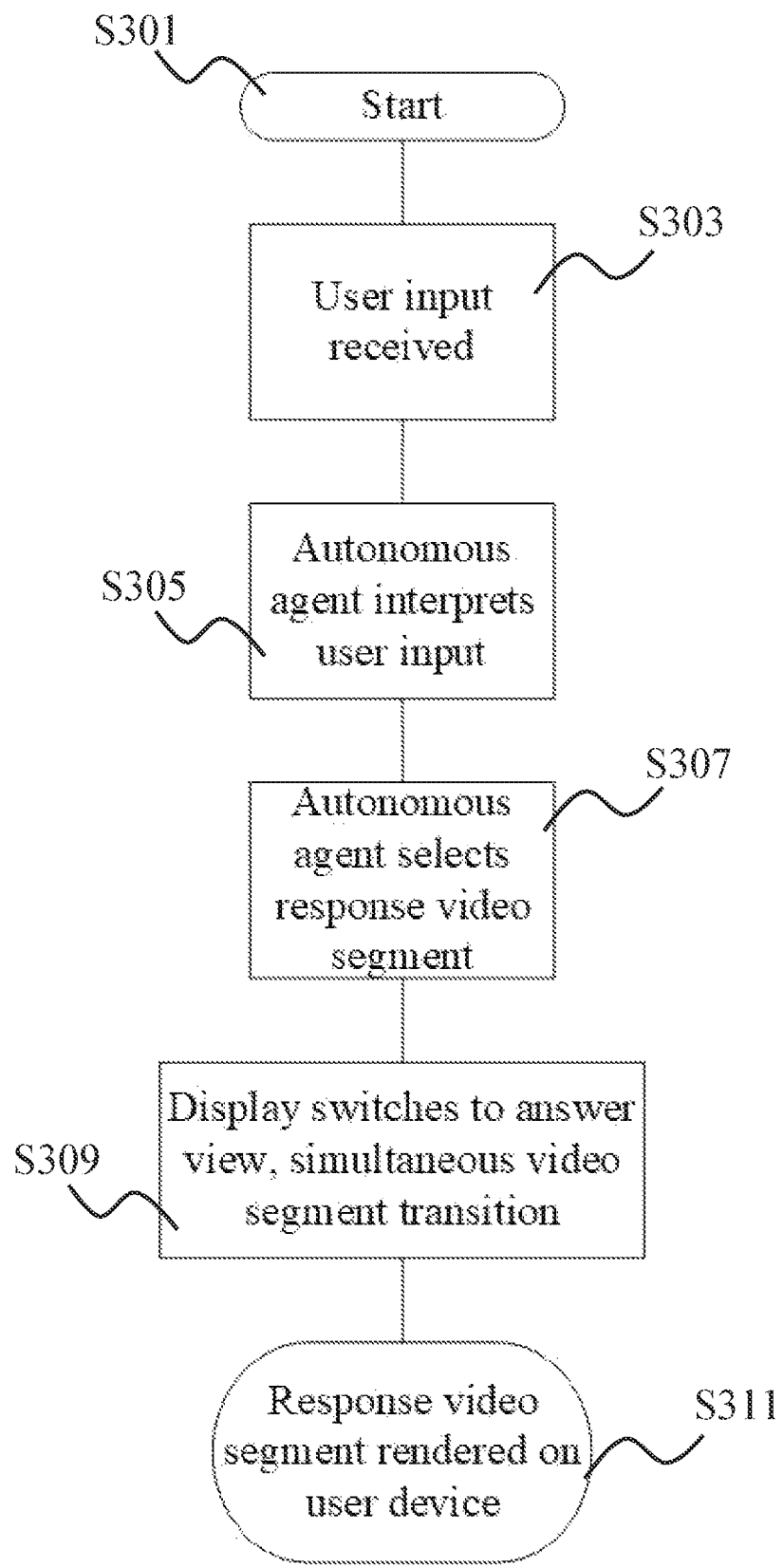
FIG. 3 shows a high-level flow chart for a method of implementing a question-answer exchange between a user and an AI-agent based on pre-recorded video segments.

FIG. 3 shows a flowchart that demonstrates a question-answer exchange between the user and the Twyn. FIG. 3 begins at a step S301, with the question view displayed, as per FIG. 2(*a*). The question view could be entered by the user previously interrupting the Twyn in the answer view, or automatically upon reaching a predefined termination point in the timeline of a previous video segment.

In a step S303, a user input is received. The user input may be a voice input of the selection of a predetermined question. Data of the voice input is communicated to the Twyn for interpretation (more specifically, a text transcript of the voice input is extracted locally at the computer device, and transmitted to the conversation management system 120 for processing, in the manner described above). In FIG. 3, the interpretation of the user input by the autonomous agent is represented by step S305.

At a step S307, an answer video segment (also described herein as a response segment) is selected in response. The response video segment is selected based on the interpretation of the voice input, as described above.

At a step S309, a transition from the question view to the answer view occurs, with the selected video segment streamed from the video streaming server 130 and displayed (S311) in the main display area 210 of the answer view, as per FIG. 2(*b*).

Figure 4:
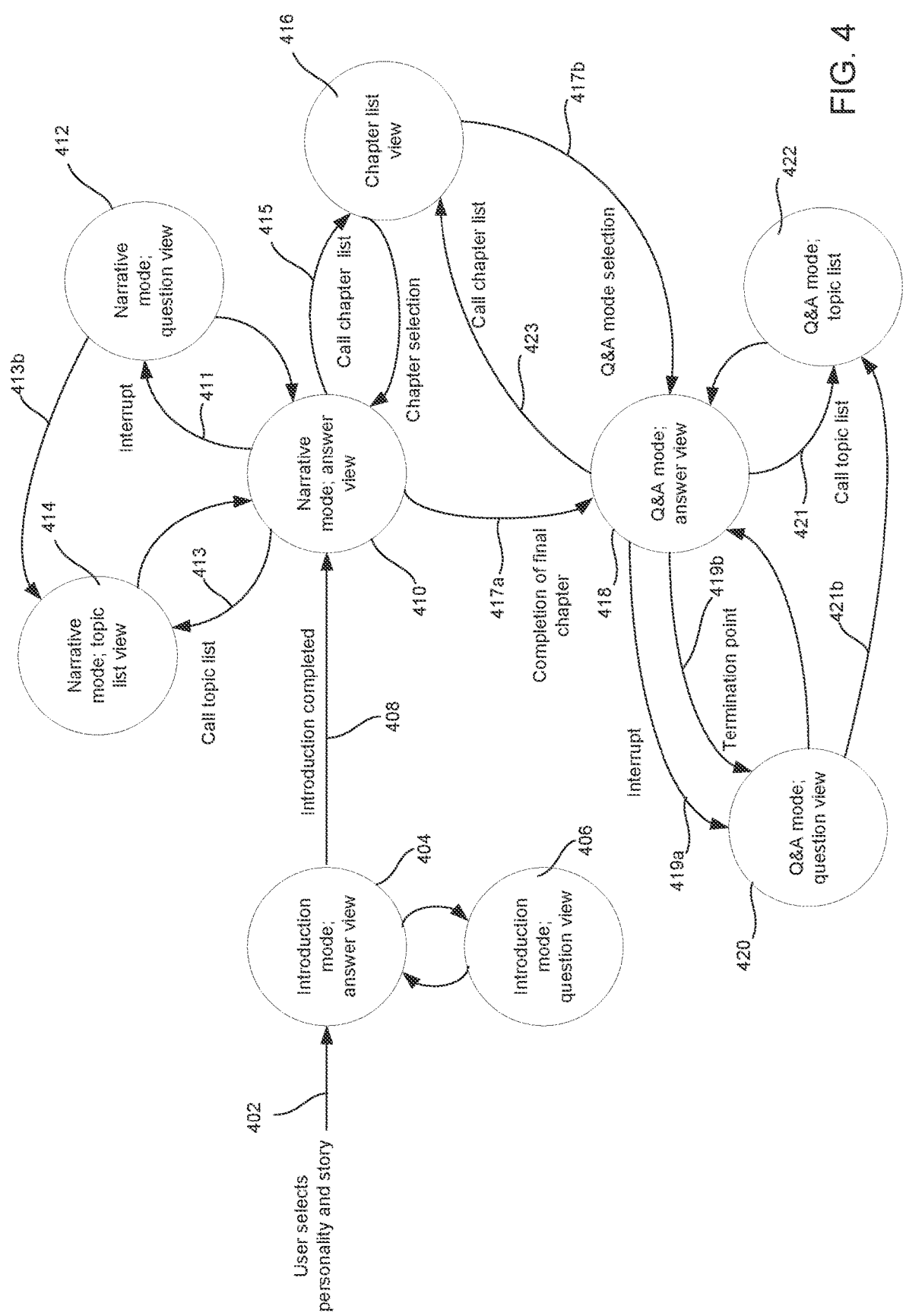
FIG. 4 shows a state machine for managing a narrative-based conversation flow between a user and an AI agent.

Over the course of a user-Twyn conversation, the user device 100 typically transitions between the question view and the answer view multiple times, with different video segments shown in the answer view each time, and the transitions between the question and answer views masking the transitions between the video segments. In the example of FIG. 4, described below, question-answer exchanges can occur both in the narrative mode and the Q&A mode.

FIG. 4 shows a state machine diagram to illustrate the management of a conversation flow within the system in a way that responds to user input. It will be appreciated that FIG. 3 provides a high-level overview of the way in which conversation flow is managed, and is not necessarily reflective of the actual program state or structure within the system. FIG. 4 generally favours conciseness over completeness, and is not necessarily reflective of all possible states and transitions that may occur within the system.

Broadly speaking, the conversation flow is based around two modes the narrative mode and the Q&A mode described briefly above. In either mode, the user can enter the question view from the answer view by selecting the interrupt icon 208. In the Q&A mode, a transition from the question mode to the answer mode occurs automatically when a termination point is reached in the timeline of the video segment currently being played back. In both modes, the user also has the option to call a topic list (FIG. 12(*b*)) to select from predetermined topics or a chapter list (FIG. 12(*b*)). The chapter list 12(*a*) allows the user to switch between the chapter mode and the Q&A mode, and to navigate to different chapters of the former.

The example of FIG. 4 commences at the point at which a user has selected (step 402) a personality profile and a story associated with that person. The user's selection has the effect of instigation a conversation (or "session") between the user and the applicable Twyn, with the Twyn's video segments selected from a library of pre-recorded video segments associated with the selected story and streamed from the content database 134. State of the conversation is maintained and updated at one or both of the computer device 100 and the conversation management system 120 in the manner described below.

The conversation commences, in an introduction mode 404, with a brief introductory video from the Twyn, delivered in the answer view. As with other video segments, the introductory video is an authentic, pre-recorded video, with the possible exception that the video and audio is briefly manipulated once to cause the Twyn to speak the user's name, as noted above. The introduction segment might include an explanation of the scope of the story, the options open to the user, and end with the Twyn asking the user a pre-recorded question and the GUI transitioning to the answer view. As with other interactive exchanges, the user's response is captured and processed, causing a second introductory video segment to be selected, and the GUI to transition back to the answer view to deliver the second introductory segment. This back-and-forth can occur one or more times as part of the introduction. In the introduction mode, the system thus switches between question and answer states 404, 406. As noted above, the "question" and "answer" terminology refers only to the layout of the video images, and does not necessarily reflect the conversation flow at all times; in the introduction mode specifically, the roles of the user and the Twyn are essentially reversed, with the answer view used to direct question(s) from the Twyn to the user in the answer state 404, and the user's response being captured in the question state 406.

Once the introductory exchange has completed, the system switches, by default, to the narrative mode (step 408), commencing in an answer state 410. No input is required from the user in the narrative mode. If the user provides no input, the Twyn is capable of delivering video content in a "monologue" style, by outputting a series video segments in accordance with the chapter structure of the selected story, remaining in the answer state 410 throughout (in this case, the answer view is used to deliver the Twyn's monologue, without any user questions).

Nevertheless, the user is encouraged to provide input in the narrative mode, for example with the provision of "extra" video content that is only available if they actively engage by asking the Twyn questions or selecting from predetermined topics. An interrupt input (411) from the user causes a transition to a question state 412, with the GUI transitioning to the question view. The user also has the option of calling (413) a topic list, causing a transition to a topic selection state 414, with the GUI transition to a topic view.

Figure 12B:
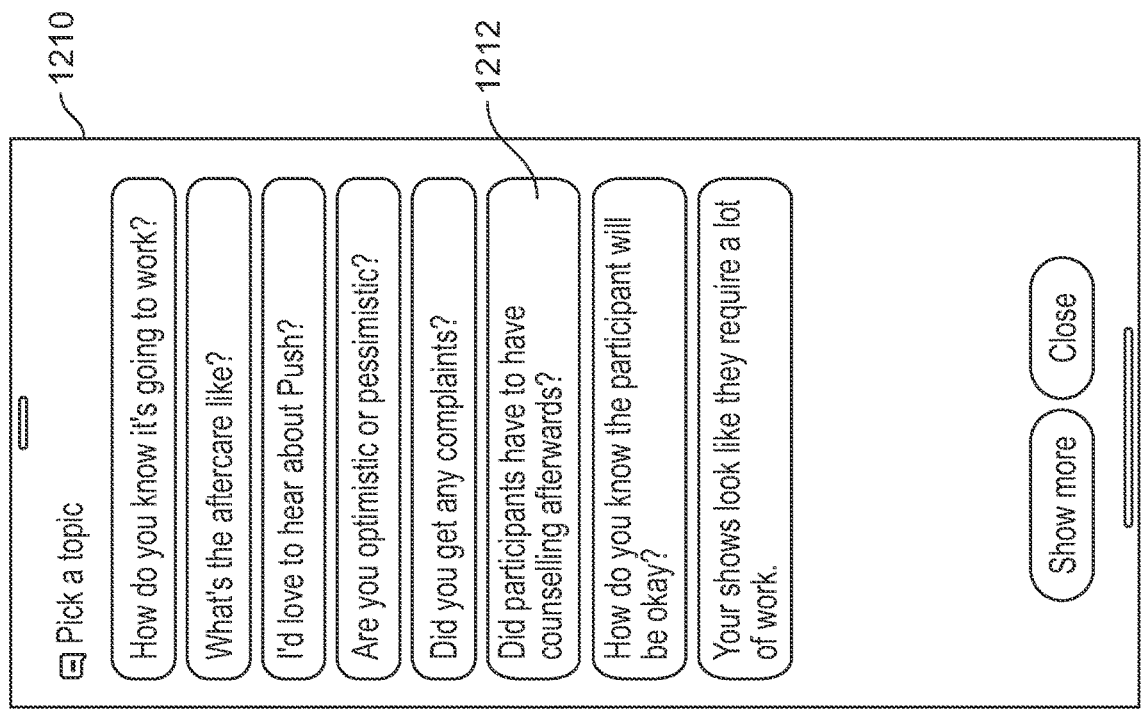
FIG. 12(b) shows a topic list view rendered on a display.
Figure 12A:
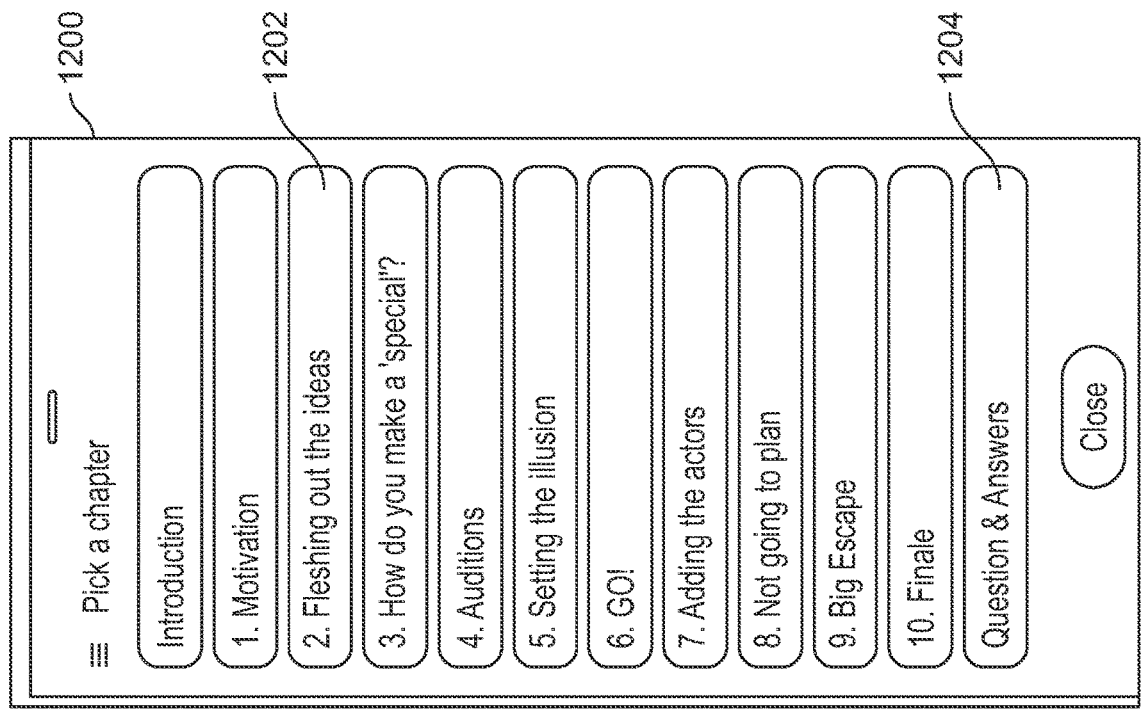
FIG. 12(a) shows a chapter list view rendered on a display.

FIG. 12(*b*) shows an example of a topic view, in which a topic list 1210 is displayed. The topic list 1202 comprises selectable topics 1212, which a user can select from, as an alternative to providing voice input in the answer view, in the manner described above. The list of topis is specific to the current chapter of the story.

Returning to the narrative mode FIG. 4, the user also has the option of calling (415) a chapter list, causing a transition to a chapter selection state 416, with the GUI transitioning to a chapter view.

FIG. 12(*a*) shows an example of a chapter view, in which a chapter list 1200 is displayed. By default, chapters of the story would be delivered in the order they are shown in the chapter list 1202. However, from the chapter view, the user can "jump" between the chapters, in any order they choose, by selecting any desired chapter 1202 in the list. A Q&A option 1204 is also provided, in order to switch the conversation to the Q&A mode (see below).

A transition from the question state 410 to the question, topic or chapter states 412, 414, 416 causes playback of the current video segment to be paused or terminated. For the most part, one a new video segment has been selected, the conversation will remain in the narrative mode as it transitions back to the answer state 410. An exception is that selection of the Q&A option 1204 in the chapter list 1200 switches the conversation to the Q&A mode, and a transition to an answer state 418 of the Q&A mode instead (see below).

In FIGS. 12(*a*) and 12(*b*), it can be seen that the chapter and topic lists 1200, 1210 have the appearance of obscuring the main and secondary display areas. Blurred images can be discerned in the main and secondary display regions, appearing behind the list 1200, 1210 in question. These could be a blurred images of the frames that were visible immediately before the list was called in the man and secondary display regions, or they may be "stock" images that give a similar impression of the list obscuring the videos in the main and secondary display regions. The appearance and disappearance of the list 1200, 1210 allows the transition to the next video segment to be masked.

Upon completion of a final chapter (417*a*) in the answer state 410, or upon selection (417*b*) of the Q&A option 1204 in the chapter selection state 416, the conversation switches to the Q&A mode, commencing in the answer state 418 with the GUI in the answer view. For example, the Q&A mode might commence with a pre-recorded video segment explaining that the user now has an opportunity to ask the Twyn questions. Alternatively, the Q&A mode can commence in a question state 420 straight away. In Q&A mode, a switch from the answer state 418 to the question state 420 can be caused by an interrupt input (419*a*), as in the conversation mode, but can also occur automatically (419*b*) upon reaching a predetermined transition point in the current video segment. The transition point could be an endpoint of the video segment, or a point shortly before the end of the video segment (so that the video segment continues playing during a short transition effect to the question view, as in the examples below). In the question state 420, the question view is rendered.

As in the narrative mode, in the Q&A mode, the user can call (421) a topic list, causing a switch to a topic selection state 422 and the rendering of a topic list in the manner described above, but with topics designed around an open-ended question-and-answer exchange with the Twyn.

The user can also return (423) to the chapter selection state 416, in order to navigate back to the narrative mode should they so wish.

Figure 6:
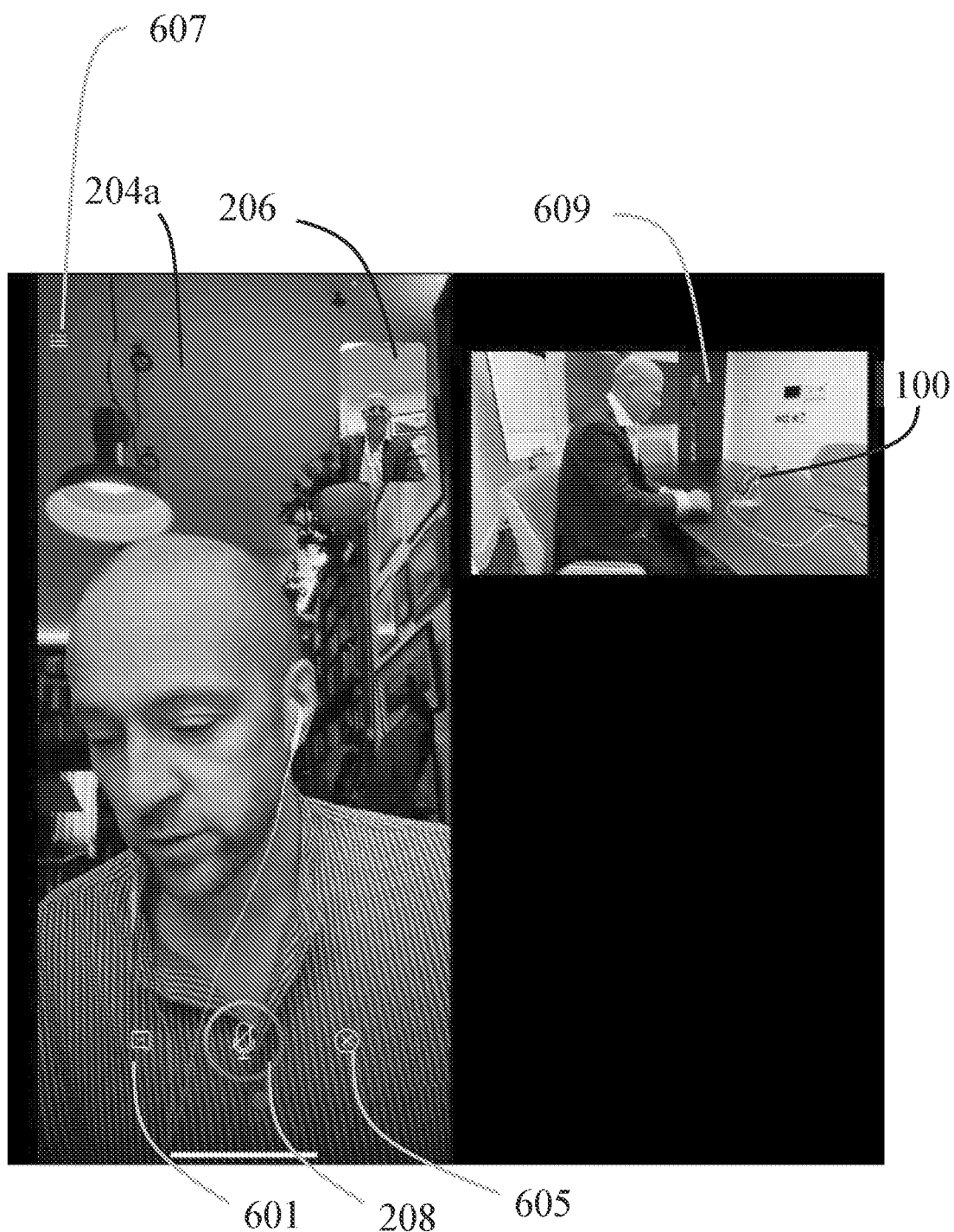
FIG. 6 shows a snapshot of answer view, in which a first video segment is displayed.

FIG. 6 shows further details of an example GUI in an answer view. In addition to the interrupt icon 208, a selectable topic icon 601 and a selectable chapter icon 607 are displayed. The topic icon 601 is selectable to switch to the topic list state 414, 422 in either mode and the chapter icon is selectable to transition to the chapter selection state 416. A termination option 605 is also provided to end the conversation (omitted from FIG. 4 for conciseness).

Figure 8C:
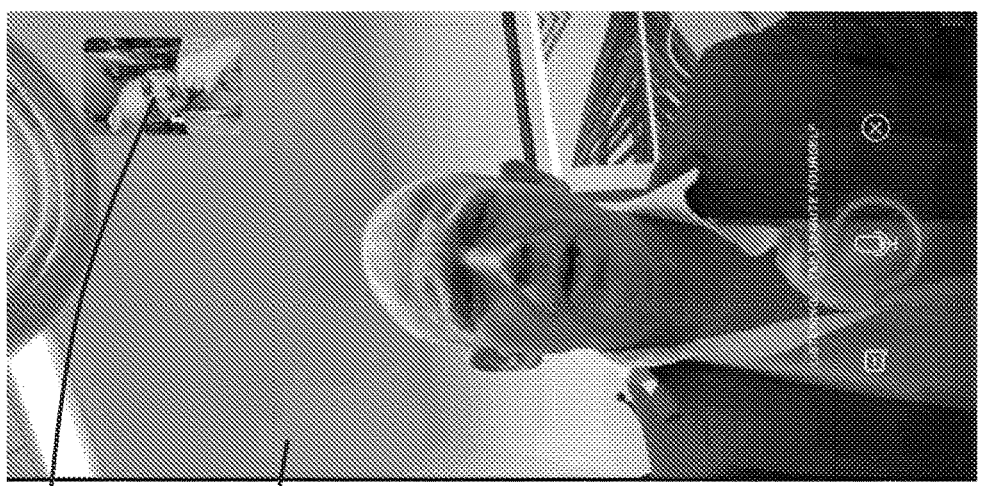
FIGS. 8(a)-(c) shows subsequent snapshots of the first transition effect.
Figure 8B:
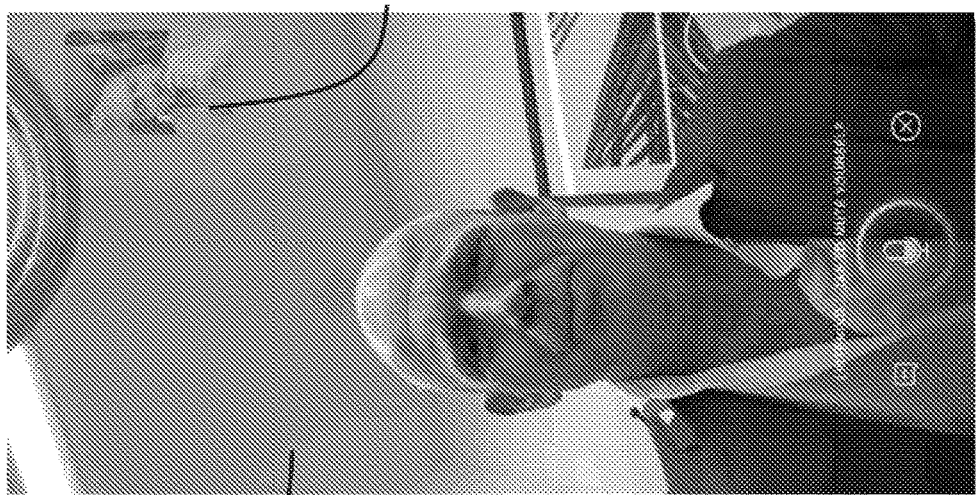
Figure 8A:
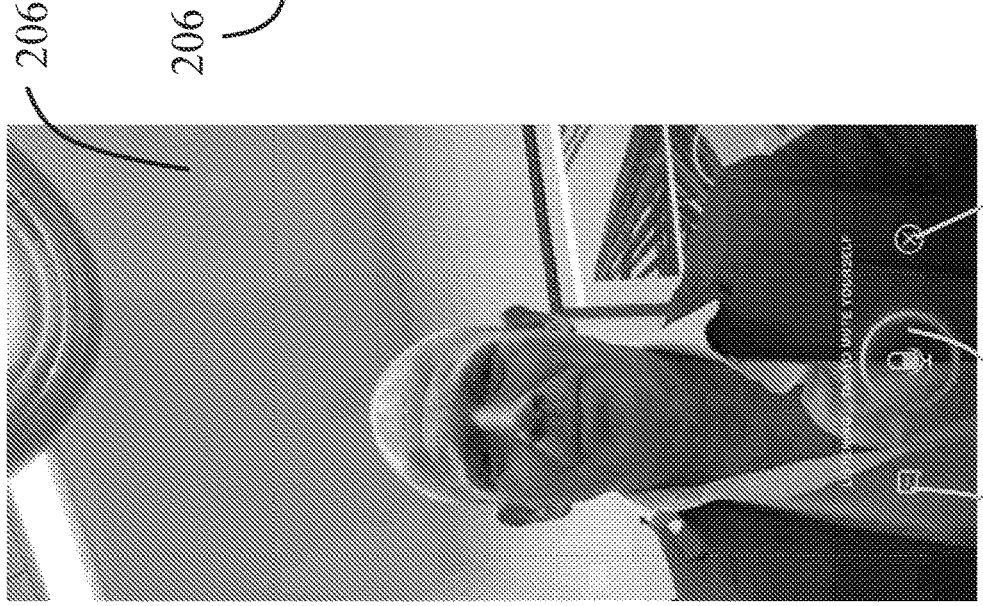

FIG. 8(*c*) shows an example GUI in a question view, with the topic and termination icons 601, 605 also available in the question view. The topic icon is selectable in the question view as well, to call the topic list 1210, corresponding to the state changes denoted by reference numerals 413*b* and 421*b* in FIG. 4.

The narrative mode in particular (but also the question mode) might involve "stitching together" multiple video segments within the answer view. In this context, conventional video editing techniques can be used to manage transitions between video segments, leveraging the chapter hierarchy and structure. For example, title screens or switches to "third party" content (such as clips or trailers from the performer earlier movies, television shows etc.) can be used.

Another technique which can be deployed to mask transitions between different segments in the answer view (without transitioning to the question view and back again) is the deliberate introduction of video "artefacts" to coincide with the transition. Such effects could, for example, replicate a video image briefly freezing or otherwise glitching, or the brief introduction of visual noise, similar to the kind of artefacts that are often experienced on real life video calls. This technique can also be used in the Q&A mode as well as the narrative mode, but is used sparingly, as overuse would be detrimental to the user experience.

Figure 5:
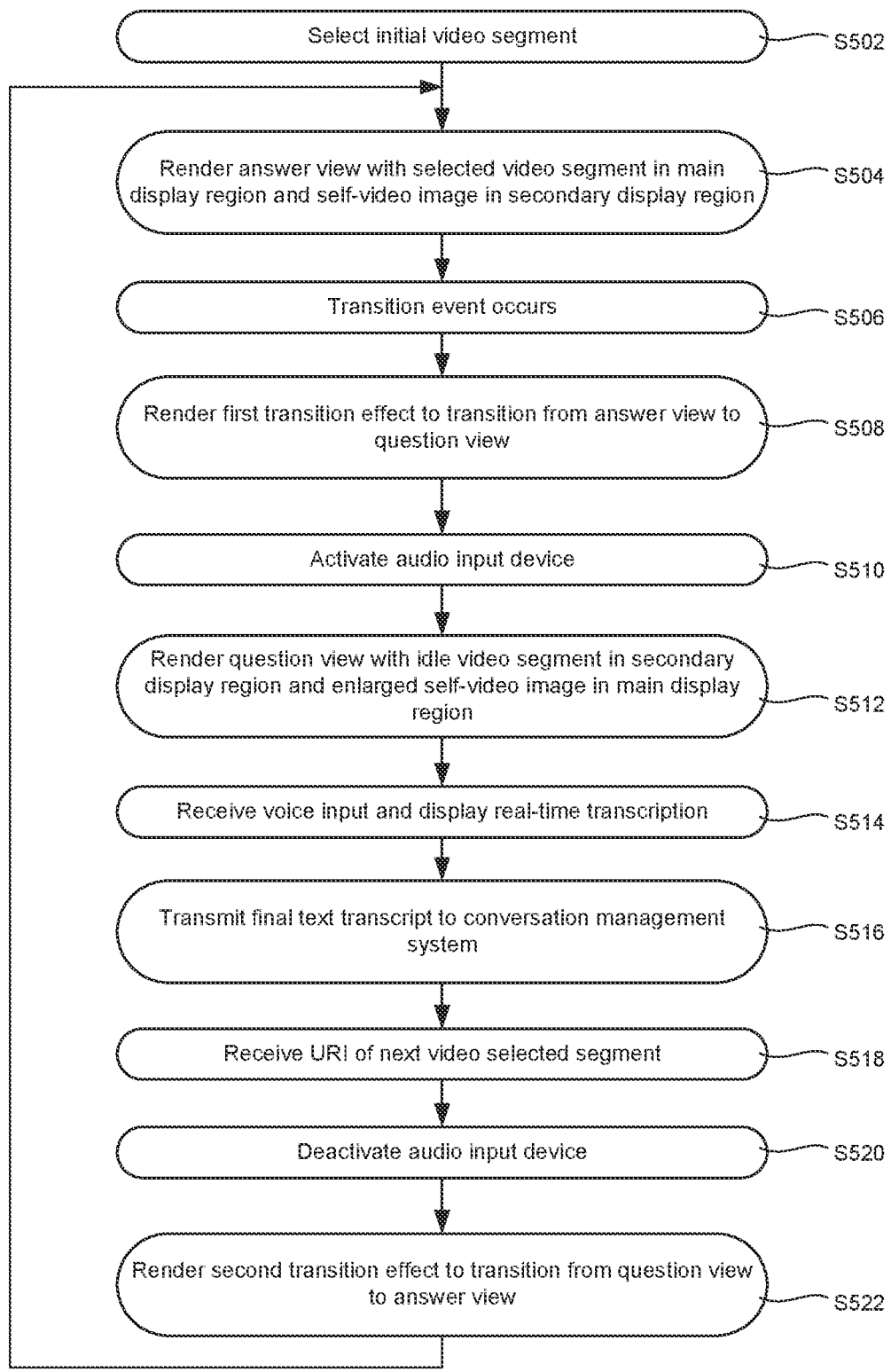
FIG. 5 shows a more detailed flow chart for a process of implementing a question-answer exchange that includes visual transition effects between question and answer views.

FIG. 5 shows a more detailed flow chart for a method of implementing question-answer exchanges, in which visual transition effects are used to further mask the transitions between video segments, in both the narrative and Q&A modes.

The description of FIG. 5 also references FIGS. 6-11, which depict examples of visual effects that might be used to transition between the question view and answer view at different steps of the method. Each of FIGS. 6-11 depicts a GUI snapshot on the left hand side, with a corresponding view 604, shown to the right, of a user interacting with the device 100 at that point in time.

At step S502, the method commences in the answer view, with some initial video segment selected.

The selected video segment is rendered (S504) in main display region of the answer view.

FIG. 6 shows a snapshot of an example GUI at some point during step S504, with a first video segment 204*a* selected and rendered in the main display region, and the self-image 206 rendered in the secondary display region.

At FIG. 5, step S506, a transition event occurs. The transition event could be the selected video segment reaching its termination point in the Q&A mode, or the user selecting the interrupt icon 208 in either mode.

At step S508, a first transition effect is rendered, in order to visually transition the GUI from the answer view to the question view.

Figure 7:
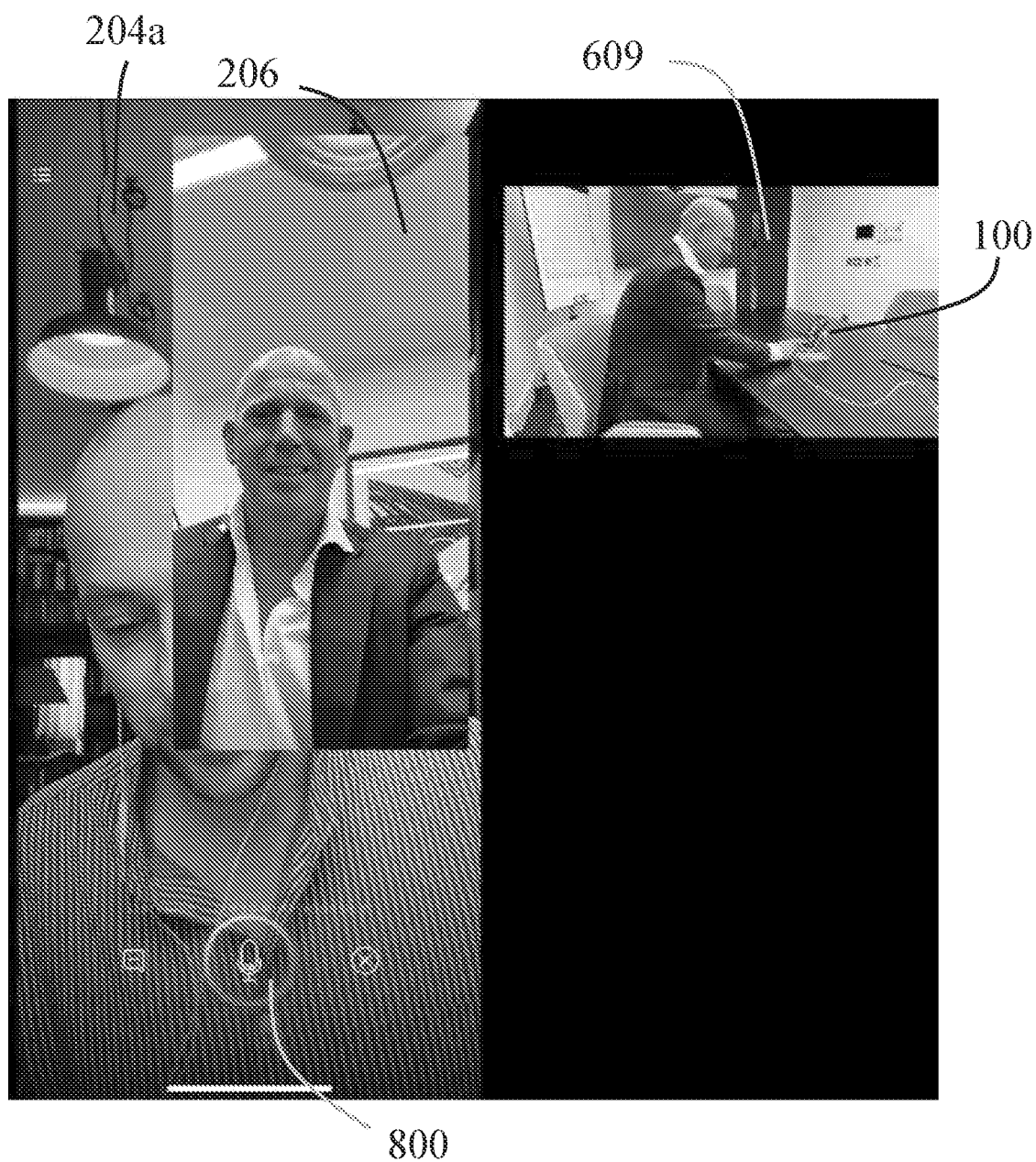
FIG. 7 shows a snapshot of a first transition effect, during a transition from the answer view of FIG. 6 to a question view.

FIGS. 7, 8(*a*) and 8(*b*) show snapshots of the GUI at different points during a possible first transition effect.

The first transition effect commences by incrementally increasing the area of the self-video image 206, thus obscuring an increasingly large area of the first video segment 204*a* until such time as the first video segment 204*a* is full obscured (no longer visible).

FIG. 7 shows the self-video image in a partially enlarged state, part way though the initial section of the first transition effect.

FIG. 8(*a*) shows the self-video image 206 fully expanded to occupy the main display area. The Twyn is not visible at this point. However, as depicted in FIGS. 8(*b*)-(*c*), an idle video segment 205 of the Twyn "fades in" from that point (by increasing its opacity incrementally from one to zero).

FIG. 8(*b*) shows the GUI with the idle segment 205 in a semi-transparent state.

FIG. 8(*c*) shows the GUI in the question view once the first transition effect has completed, with the idle image 205 now fully opaque.

In this example, the first transition effect occurs fairly rapidly—slow enough that it is visible, but fast enough so to not unduly disrupt the conversation flow, e.g. having a duration of anything from a fraction of a second (of the order of 0.1 seconds) to a second or a few seconds (of the order of 1 second).

At FIG. 5, step 510, the audio input device 110 is activated. Although shown after step S508, the audio input device 110 could be activated at any suitable time, e.g. to coincide with the start of the first transition effect, part way through it, or upon completion thereof. The Twyn is now a "listening" state, able to receive and transcribe any voice input captured from the user.

At step S514, voice input is received from the user, and transcribed and displayed in real-time or near real time as it is received. Implementing the ASR locally at the device 100 generally allows faster transcription in this context. The user can thus see and correct and errors in the text transcription before the final transcript is sent to the conversation management system 120.

Figure 9:
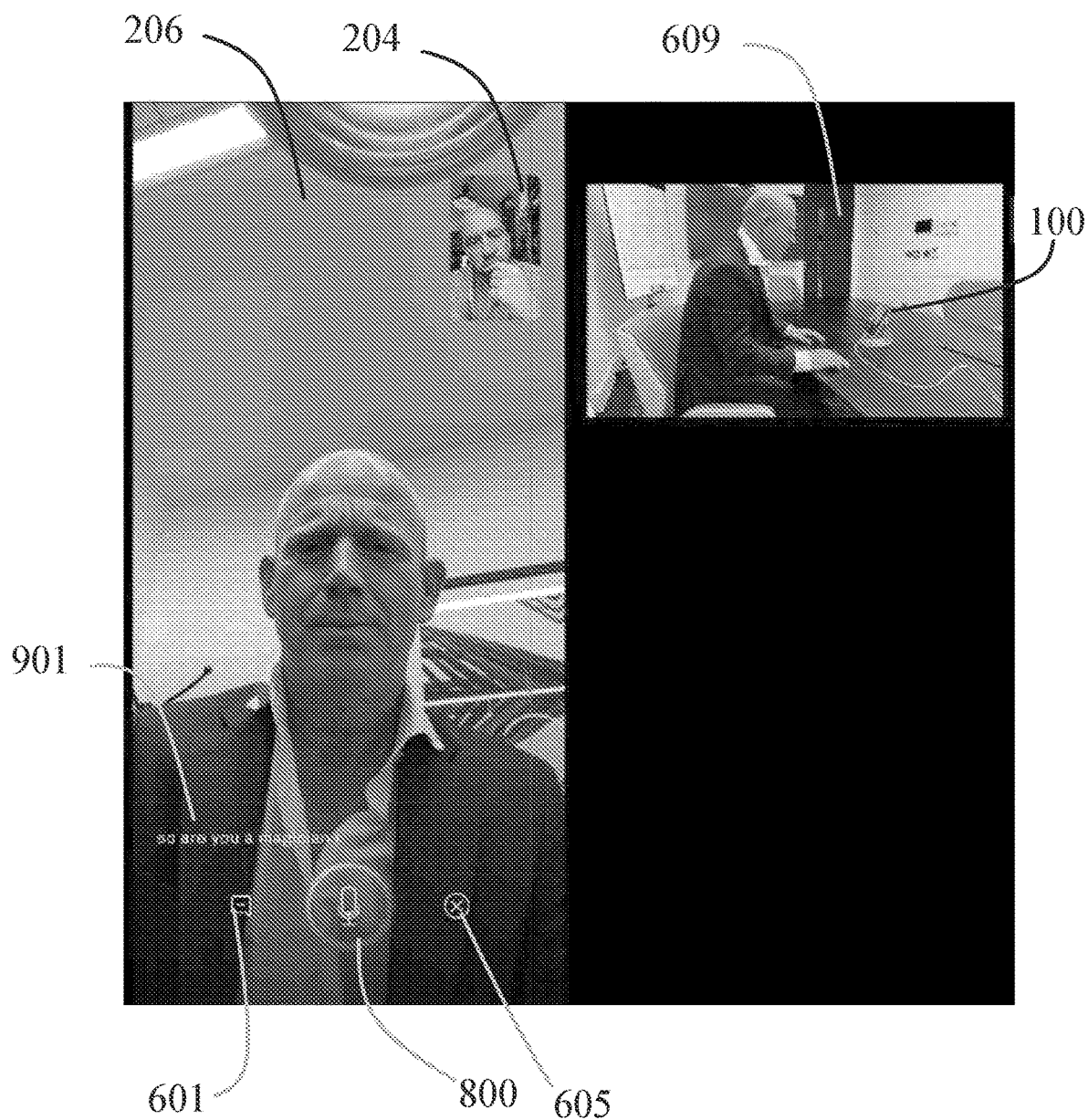
FIG. 9 shows a snapshot of an answer view, following completion of the transition effect of FIGS. 7 and 8(a)-(c)

FIG. 9 shows a snapshot of the GUI in the question view, at a point that is part way through a voice input from the user. A partial text transcript 901 of the voice input received so far is displayed.

In the depicted examples of FIGS. 8(*a*)-9, a mute icon 800 is displayed. This allows the user to deactivate (mute) the audio input device 110, providing an additional privacy safeguard for the user.

The mute icon 800 is visually similar to the interrupt icon 208 in the question view, though this merely one possible design choice. In the answer mode, the interrupt icon 208 includes a diagonal line through a microphone symbol, indicating that the microphone 110 is not active. The same microphone symbol is used for the mute icon 800, in the question view, nut without any diagonal line, to indicate that the microphone 110 is active.

At FIG. 5, step S516, the final text transcript is transmitted to the conversation management system 120. For example, the text transcript can be deemed final after some predetermined interval of silence, following an interval of detected user speech. The conversation management system 120 uses the final text transcript to select a video segment to be played next (the Twyn's pre-recorded response) and, at step S518, a link to the next video segment is received from the conversation management system 120.

At step S520, the audio input device 110 is deactivated, and at step S522, a second transition effect is rendered to transition the GUI back to the answer view, in order to deliver the Twyn's pre-recorded response. Notwithstanding the depicted ordering of the steps, the audio input device 110 can be deactivated at any suitable point in the process (upon determining the final transcript or at any point thereafter).

The second transition effect is largely a reverse of the first transition effect: the next video segment is rendered behind the self-video image 206, fully obscured by the self-video image 206 initially. The self-video image 206 is incrementally reduced in size, thus revealing an increasing portion of the next video segment.

Figure 10:
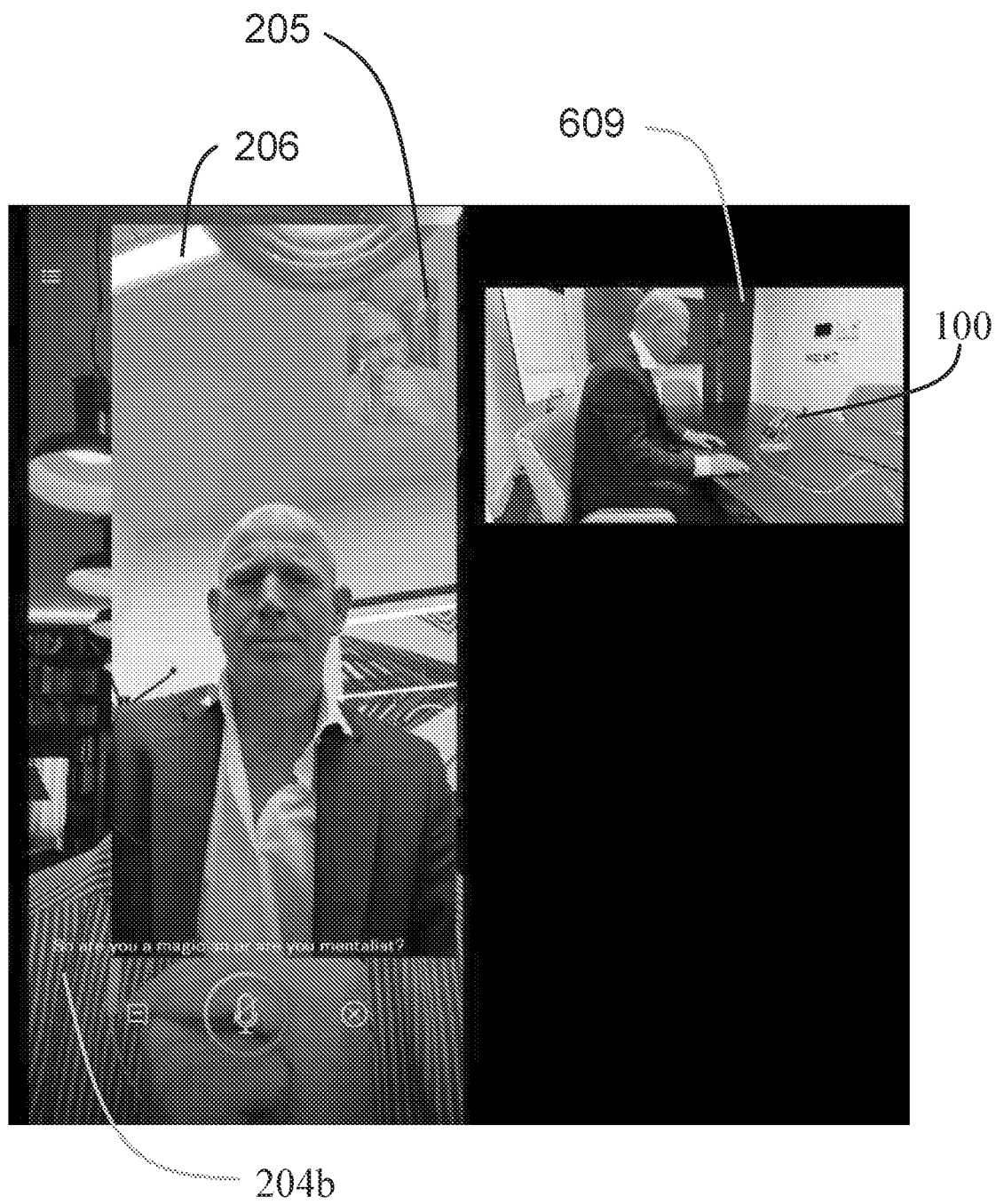
FIG. 10 shows a second transition effect, from the answer view of FIG. 9 back to the question view of FIG. 7, but with a second video segment displayed in place of the first video segment of FIG. 7.

FIG. 10 shows the GUI part way through an example second transition effect. The self-video image 206 has been partially reduced, so as to partially reveal a second video segment 204b behind the self-video image 206 in the main display area.

In this example, the idle image 205 is faded out simultaneously with the re-sizing of the self-image 206 (this is slightly different to the first transition effect, in which the idle video segment 205 only fades in after the first video segment 204a has been fully obscured). Hence, in FIG. 10, the latter can be seen in a partially opaque state. There is a brief period when two Twyn images are visible—the partially opaque idle image 205, and the partially obscured video segment 204. In FIG. 10, the differences in the visual content of the idle image 205 and the second video segment 204b can be seen; however, as part of a dynamic transition effect occurring on the same timescale as the first transition effect, those differences are virtually impossible to discern, and in any event the user's eye will inevitably be drawn away from the idle image 205 by the visual activity in the main display region.

Figure 11:
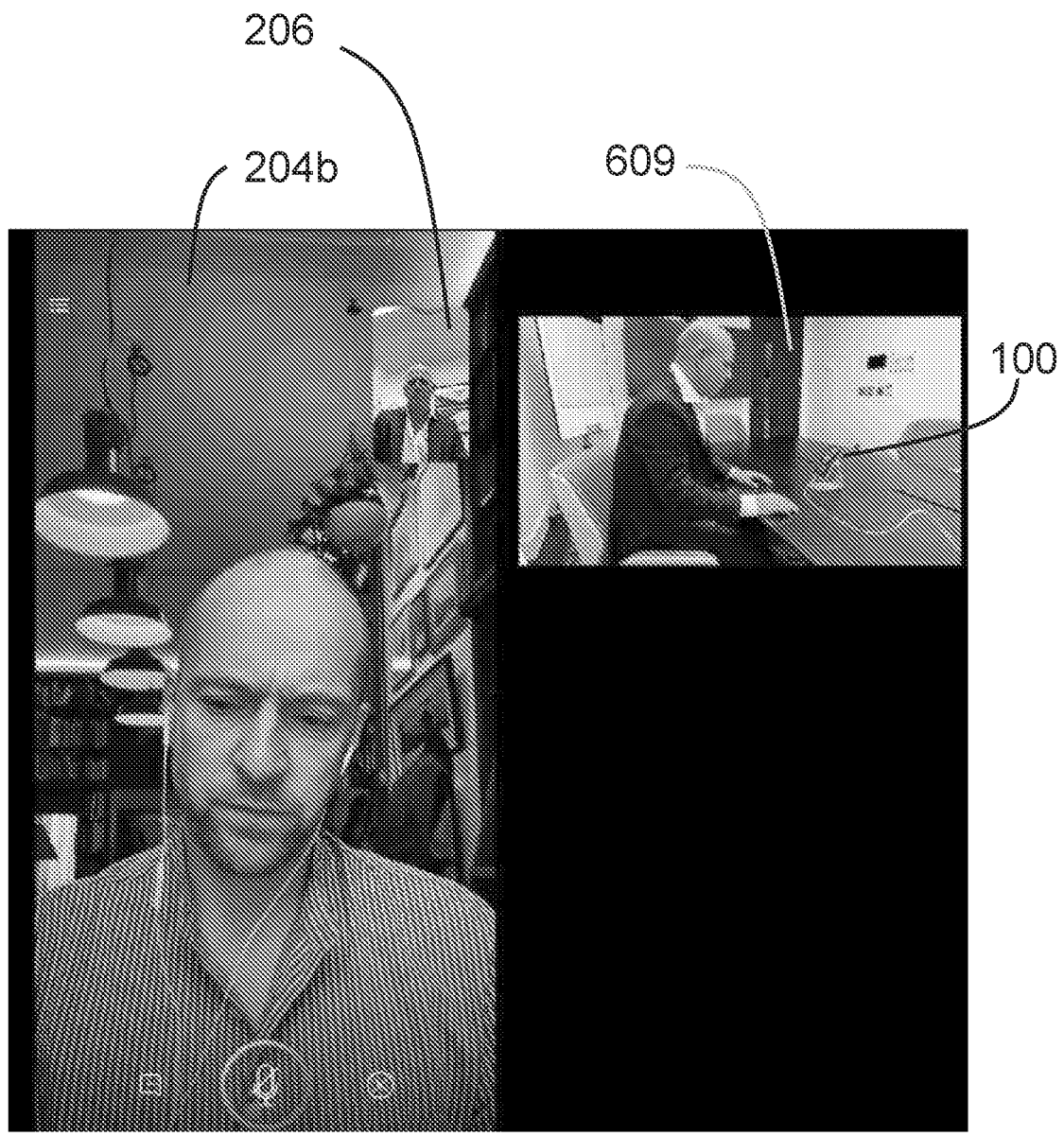
FIG. 11 shows a snapshot of the answer view following the second transition effect of FIG. 10, in which the second video segment is rendered.

FIG. 11 shows the GUI in the answer view one more, with the self-image 2056 returned to the secondary display area, but the second video segment 204b now occupying the main display area in place of the first video segment 204a of FIG. 6.

As represented by the arrow from step S522 back to step S504, the steps of the method may be repeated any number of times, with new video segments, as needed to transition back and forth between the question and answer views within the conversation.

As will be appreciated, FIGS. 6-11 represent merely one example of visual transition effects that can be used in the described context.

Figure 13:
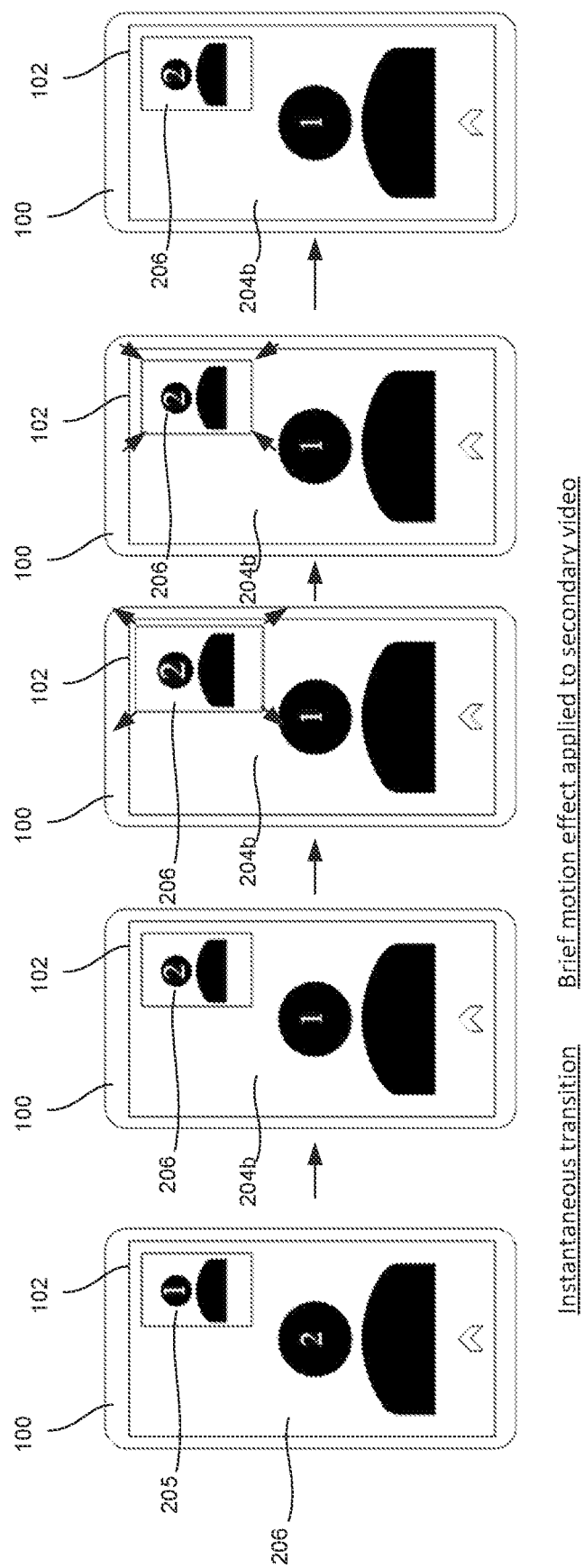
FIG. 13 schematically illustrates an alternative visual transition between question and answer views.

FIG. 13 schematically depicts an alternative transition scheme, with instantaneous transitions between the question and answer views. In this example, the face swap occurs substantially instantaneously (instantaneously, or at least fast enough to appear instantaneous to the human visual system). That is to say, the transition from the question view with the self-image 206 in the main display region and the idle image 205 in the secondary display region is replaced instantaneously with the answer view containing the next video segment 204b in the main display area and the self-video image in the secondary display region. To further mask the transition, a brief motion effect is applied to the self-image 206 in the secondary display region (in this example, the area of the self-image 206 is briefly increased and then reduced in this example, so that it appears to briefly "bounce" towards the user). This distracts the user's attention, further masking the transition from the idle image 205 to the next video segment 204b. Although not depicted in FIG. 13, the same transition can be applied to transition from the answer view to the question view, with the motion effect applied to the idle image 205 in the secondary display region.

It will be appreciated that the examples described above are illustrative rather than exhaustive. FIG. 1 depicts one possible system architecture in which the present techniques can be implemented, which is not exhaustive. For example, the described techniques could be implemented entirely at the computer device 100, or the intent recognition and/or the content management components 422, 122 could be implemented locally at the device, in conjunction with the video server 130. As another example, the ASR component 110 could be implemented remotely, e.g. at the conversation management system 120 with the user's voice input streamed to the conversation management system 120 from the computer device 100. In general, the functional components 108, 110, 122, 124 of FIG. 1 can be implemented at any suitable location or locations within a localized or distributed computer system. A computer system comprises computing hardware which may be configured to execute any of the steps or functions taught herein. The term computing hardware encompasses any form/combination of hardware configured to execute steps or functions taught herein. Such computing hardware may comprise one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer read able instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

Other variations and implementations are also within the scope of the instant disclosure. The scope of the instant disclosure is not defined by the described embodiments, but only by the accompanying claims.

The invention claimed is:

1. One or more non-transitory computer-readable media comprising executable program instructions for effecting a video-based conversational interface at a computer system, wherein the executable program instructions, when executed on one or more processors of a computer system, to cause the computer system to perform operations comprising:

receiving, from a user of the computer system, a first natural language input;

causing a display of the computer system to render an answer view, in which a first pre-recorded video response segment depicting a real person, selected based on the first natural language input, is displayed in a main display region, and a self-video image of the user, captured by an image capture device of the computer system, is displayed in a peripheral display region having a smaller area than the main display region;

transitioning the display from the answer view to a question view to render a first transition effect, by enlarging the self-video image to replace the first pre-recorded video response segment in the main display region and displaying an idle image of the real person or idle video segment of the real person in the peripheral display region, wherein the first transition effect comprises a first dynamic visual effect applied to at least one of: (i) the self-video image or (ii) the idle image of the real person or idle video segment of the real person, wherein the first transition effect masks a first transition between the first pre-recorded video response segment displayed in the main display region in the answer view and the idle image or idle video segment displayed in the peripheral display region in the question view;

receiving, from the user, a second natural language input; and transitioning the display from the question view to the answer view to render a second transition effect, by reducing the self-video image to occupy the peripheral display region and replacing the self-video image in the main display region with a second pre-recorded video response segment depicting the real person, the second pre-recorded video response segment selected based on the second natural language input, wherein the first and second pre-recorded video response segments are each selected, based on the first and second natural language inputs respectively, from a set of pre-recorded video response segments spoken by the real person, wherein each of the first pre-recorded video response segment, the second pre-recorded video response segment, and the idle image of the real person or idle video segment of the real person displays an image or video segment of the real person, wherein the second transition effect comprises a second dynamic visual effect applied to at least one of: (i) the self-video image, or (ii) the idle image of the real person or idle video segment of the real person, and wherein the second transition effect masks a second transition between the idle image of the real person or idle video segment of the real person displayed in the peripheral display region in the question view and the second pre-recorded video response segment displayed in the main display region in the answer view.

2. The one or more non-transitory computer-readable media of claim 1, wherein the first and second natural language inputs comprise first and second voice inputs received at the computer system.

3. The one or more non-transitory computer-readable media of claim 1, wherein the executable program instructions further cause the computing system to render the first transition effect to transition from the answer view to the question view, by incrementally increasing the area of the self-video image, so as to obscure an increasingly larger area of the first pre-recorded video response segment in the main display region, until the first pre-recorded video response segment is fully obscured by the enlarged self-video image.

4. The one or more non-transitory computer-readable media of claim 3, wherein the first transition effect further comprises incrementally increasing an opacity of the idle image of the real person or idle video segment of the real person from zero to one.

5. The one or more non-transitory computer-readable media of claim 1, wherein the executable program instructions further cause the computing system to render the second transition effect to transition from the question view to the answer view, by incrementally reducing the area of the self-video image, so as to reveal an increasingly large area of the second pre-recorded video response segment in the main display region.

6. The one or more non-transitory computer-readable media of claim 5, wherein the second transition effect additionally comprises incrementally reducing an opacity of the idle image of the real person or idle video segment of the real person from one to zero as the second transition effect is rendered.

7. The one or more non-transitory computer-readable media of claim 1, wherein the transition from the question view to the answer view is substantially instantaneous, and a motion effect is applied to the self-video image in the peripheral display region immediately thereafter.

8. The one or more non-transitory computer-readable media of claim 7, wherein the transition from the answer view to the question view is substantially instantaneous, and said motion effect is applied to the idle image of the real person or idle video segment of the real person in the peripheral display region immediately thereafter.

9. The one or more non-transitory computer-readable media of claim 1, said operations further comprising:
 transmitting, in a first message to a conversation management system, remote from the computer system, data of the first natural language input for selecting the first video segment at the conversation management system;
 receiving from the conversation management system a first response comprising or indicating the first video segment;
 transmitting, in a second message to the conversation management system, data of the second natural language input for selecting the second video segment at the conversation management system; and
 receiving from the conversation management system a second response comprising or indicating the first video segment.

10. The one or more non-transitory computer-readable media of claim 9, wherein the first and second natural language inputs comprise first and second voice inputs received at the computer system, wherein the data of the first and second natural language inputs comprises text extracted from the first and second voice inputs respectively, using automatic speech recognition performed at the computer system.

11. The one or more non-transitory computer-readable media of claim 10, wherein first and second links, indicating the first and second video segments respectively, are provided in the first and second responses respectively, the first and second links used to stream the first and second video segments from a video streaming server for displaying at the computer system.

12. A computer device for effecting video-based conversational interface, the computer device comprising:
 a display;
 an image capture device configured to capture a self-video image of a user of the computer device; and
 one or more hardware processors coupled to the display and the image capture device, and configured to transition the display between: (ii) an answer view, in which a selected video segment is displayed in a main display region, and the self-video image is displayed in a peripheral display region having a smaller area than the main display region, and (ii) a question view, in which the self-video image is displayed in the main display region;

wherein the one or more hardware processors are configured to receive, from the user, natural language inputs for selecting video segments to be displayed in the main display region in the answer view; and wherein the one or more hardware processors are configured to:

render the answer view with a first pre-recorded video response segment depicting a real person and occupying the main display region, the first pre-recorded video response segment selected based on a first natural language input, transition from the answer view to the question view to render a first transition effect, by enlarging the self-video image to replace the first pre-recorded video response segment in the main display region and displaying an idle image of the real person or idle video segment of the real person in the peripheral display region, wherein the first transition effect comprises a first dynamic visual effect applied to at least one of: (i) the self-video image or (ii) the idle image of the real person or idle video segment of the real person, wherein the first transition effect masks a first transition between the first pre-recorded video response segment displayed in the main display region in the answer view and the idle image or idle video segment displayed in the peripheral display region in the question view, and transition from the question view to the answer view to render a second transition effect, by reducing the self-video image to occupy the peripheral display region and replacing the self-video image in the main display region with a second pre-recorded video response segment depicting the real person, the second pre-recorded video response segment selected based on a second natural language input, wherein the first and second pre-recorded video response segments are selected, based on the first and second natural language inputs respectively, from a set of pre-recorded video response segments spoken by the real person, wherein each of the first pre-recorded video response segment, the second pre-recorded video response segment, and the idle image of the real person or idle video segment of the real person displays an image or video segment of the real person, wherein the second transition effect comprises a second dynamic visual effect applied to at least one of: (i) the self-video image, or (ii) the idle image of the real person or idle video segment of the real person, and wherein the second transition effect masks second a transition between the idle image of the real person or idle video segment of the real person displayed in the peripheral display region in the question view and the second pre-recorded video response segment displayed in the main display region in the answer view.

13. The computer device of claim 12, wherein the one or more hardware processors are further configured to render, on the display, a list of predetermined conversation prompts that are selectable to cause a video segment to be selected, whereby the user can choose to provide natural language input or select one of the predetermined conversation prompts in order to transition to the answer view.

14. The computer device of claim 12, wherein the one or more hardware processors are configured to display, in response to a topic suggestion input received in the answer view, a list of predetermined conversation prompts, which is rendered so as to obscure the main display region, each of the predetermined conversation prompts selectable to cause a different video segment to be selected and rendered in the main display region, whereby the list of predetermined conversation prompts masks a transition to the different video segment in that event.

15. The computer device of claim 12, wherein the one or more hardware processors are configured to instigate the transition from the answer view to the question view responsive to:

the first pre-recorded video response segment reaching a predetermined termination time, or an interrupt input received from the user at the computer device.

16. The computer device of claim 15, wherein the answer view includes a visual interrupt icon that is selectable to instigate the interrupt input.

17. The computer device of claim 12, wherein the one or more hardware processors are coupled to an audio capture device of the computer device, and are configured to begin capturing a voice input from the user upon transitioning to the question view, and extract the second natural language input from the voice input for selecting the second pre-recorded video response segment using automated speech recognition.

18. A computer system for effecting video-based conversational interface, the computer system comprising:

one or more hardware processors configured to implement:

a rendering component configured to generate rendering data for rendering, on a display of a computer device, views of the video-based conversational interface, the rendering component configured to transition between: (ii) an answer view, in which a selected video segment is displayed in a main display region, and a self-video image, captured from a user of the computer device, is displayed in a peripheral display region having a smaller area than the main display region, and (ii) a question view, in which the self-video image is displayed in the main display region, a natural language interpretation component configured to receive natural language inputs captured from the user, and process the natural language inputs to recognize user intent therein, and a content management component configured to select the video segments, from a set of pre-recorded video response segments spoken by a real person, by matching the user intents recognized in the natural language inputs to intent labels associated with the pre-recorded video response segments, wherein the rendering component is configured to generate the rendering data so as to:

render the answer view with a first pre-recorded video response segment depicting the real person, the first pre-recorded video response segment selected based on a first natural language input and occupying the main display area, transition from the answer view to the question view to render a first transition effect, by enlarging the self-video image to replace the first pre-recorded video response segment in the main display region and displaying an idle image of the real person or idle video segment of the real person in the peripheral display region, wherein the first transition effect comprises a first dynamic visual effect applied to at least one of: (i) the self-video image or (ii) the idle image of the real person or idle video segment of the real person, wherein the first transition effect masks a first transition between the first pre-recorded video response segment displayed in the main display region in the answer view and the idle image or idle video segment displayed in the peripheral display region in the question view, and transition from the question view to the answer view to render a second transition effect, by reducing the self-video image to occupy the peripheral display region and replacing the self-video image in the main display region with a second pre-recorded video response segment depicting the real person, the second pre-recorded video response segment selected based on a second natural language input, wherein the first and second pre-recorded video response segments are selected, based on the first and second natural language inputs respectively, from the set of pre-recorded video response segments spoken by the real person, and wherein each of the first pre-recorded video response segment, the second pre-recorded video response segment, and the idle image of the real person or idle video segment of the real person displays an image or video segment of the real person, wherein the second transition effect comprises a second dynamic visual effect applied to at least one of: (i) the self-video image, or (ii) the idle image of the real person or idle video segment of the real person, and wherein the second transition effect masks second a transition between the idle image of the real person or idle video segment of the real person displayed in the peripheral display region in the question view and the second pre-recorded video response segment displayed in the main display region in the answer view.

19. The computer system of claim 18, wherein the set of pre-recorded video response segments are stored in a database of pre-recorded video segments of said real person speaking, the set of pre-recorded video segments additionally comprising narrative video segments organized arranged in multiple chapters, and multiple topics within each chapter, wherein the rendering component is configured to render a predetermined list of chapters, and a predetermined list of topics within each chapter, whereby the user can select video segments by providing natural language input, by selecting a chapter, or selecting a topic within a chapter.

\* \* \* \* \*

UNITED STATES PATENT AND TRADEMARK OFFICE
CERTIFICATE OF CORRECTION

| | |
|---|---|
| PATENT NO. | : 11,483,494 B1 |
| APPLICATION NO. | : 17/647442 |
| DATED | : October 25, 2022 |
| INVENTOR(S) | : Timothy Philip Levy et al. |

It is certified that error appears in the above-identified patent and that said Letters Patent is hereby corrected as shown below:

In the Specification

In Column 1, Line 19, delete "commands" and insert --commands.--.

In Column 4, Line 54, delete "(ii)" and insert --(i)--.

In Column 5, Line 46, delete "(ii)" and insert --(i)--.

In Column 12, Line 18, delete "topis" and insert --topics--.

In the Claims

In Column 18, Claim 12, Line 61, delete "(ii)" and insert --(i)--.

In Column 20, Claim 18, Line 33, delete "(ii)" and insert --(i)--.

Signed and Sealed this
Twenty-first Day of February, 2023

*Katherine Kelly Vidal*

Katherine Kelly Vidal
*Director of the United States Patent and Trademark Office*